US005173352A

United States Patent [19]

Parker

[11] Patent Number: 5,173,352

[45] Date of Patent: * Dec. 22, 1992

[54] RESILIENT PACKING PRODUCT AND METHOD AND APPARATUS FOR MAKING THE SAME

[75] Inventor: Johnny M. Parker, Vashon, Wash.

[73] Assignee: Ranpak Corporation, Concord Township, Ohio

[ * ] Notice: The portion of the term of this patent subsequent to Jul. 28, 2009 has been disclaimed.

[21] Appl. No.: 538,181

[22] Filed: Jun. 14, 1990

Related U.S. Application Data

[63] Continuation-in-part of Ser. No. 430,861, Nov. 2, 1989, Pat. No. 5,088,972.

[51] Int. Cl.[5] .......................... B32B 3/28; D04H 1/04

[52] U.S. Cl. .................................... 428/174; 428/152; 428/153; 428/154; 428/175; 428/182; 428/184; 428/195; 428/196; 428/211; 428/222; 428/292; 428/362; 428/369; 493/967

[58] Field of Search ............... 428/182, 184, 192, 222, 428/174, 152, 153, 226, 227, 229, 230, 292, 369, 2, 154, 362, 175, 195, 196, 207, 211; 493/967

[56] References Cited

U.S. PATENT DOCUMENTS

| | | | |
|---|---|---|---|
| 1,680,203 | 8/1929 | Cannard | 493/967 |
| 1,985,676 | 12/1934 | Hand | 270/73 |
| 2,045,498 | 6/1936 | Stevenson | 28/1 |
| 2,621,567 | 12/1952 | Lee | 93/1 |
| 2,668,573 | 2/1954 | Larsson | 154/30 |
| 2,679,887 | 6/1954 | Doyle et al. | 154/30.05 |
| 2,686,466 | 8/1954 | Lee | 106/97 |
| 2,770,302 | 11/1956 | Lee | 104/97 |
| 2,786,399 | 3/1957 | Mason et al. | 93/1 |
| 2,865,080 | 12/1958 | Hentschel | 28/1 |
| 2,924,154 | 2/1960 | Russell et al. | 93/1 |
| 2,968,857 | 1/1961 | Swerdloff et al. | 28/72 |
| 3,126,095 | 3/1964 | Caines et al. | 428/369 |
| 3,150,576 | 9/1964 | Gewiss | 93/84 |
| 3,217,988 | 11/1965 | Lightfoot et al. | 241/101 |
| 3,235,442 | 2/1966 | Stump | 428/369 |
| 3,398,223 | 8/1968 | Schatz et al. | 264/282 |
| 3,501,565 | 3/1970 | Kalwaites et al. | 264/287 |
| 3,509,797 | 5/1970 | Johnson | 493/407 |
| 3,613,522 | 10/1971 | Johnson | 156/183 |
| 3,650,877 | 3/1972 | Johnson | 493/407 |
| 3,754,498 | 8/1973 | Gil | 100/97 |
| 3,859,695 | 1/1975 | Erickson | 28/1 |
| 3,905,057 | 9/1975 | Willis et al. | 5/337 |
| 4,012,932 | 3/1977 | Gewiss | 72/187 |
| 4,075,746 | 2/1978 | Roberts | 28/264 |
| 4,085,662 | 4/1978 | Ottaviano | 493/354 |
| 4,132,155 | 1/1979 | Hicks et al. | 493/354 |
| 4,201,128 | 5/1980 | Whitehead et al. | 100/97 |
| 4,247,289 | 1/1981 | McCade | 493/386 |
| 4,410,315 | 10/1983 | Frye | 493/342 |
| 4,597,748 | 7/1986 | Wolf | 493/29 |
| 4,622,028 | 11/1986 | Bunch | 493/413 |
| 4,650,456 | 3/1987 | Armington | 493/464 |
| 4,699,609 | 10/1987 | Komaransky et al. | 493/357 |
| 4,700,939 | 10/1987 | Hathaway | 270/39 |
| 4,717,135 | 1/1988 | Hathaway | 220/52.3 |
| 4,718,654 | 1/1988 | Ehlers | 220/52.5 |
| 4,868,037 | 9/1989 | McCullough et al. | 428/222 |

FOREIGN PATENT DOCUMENTS 771877 3/1957 United Kingdom .

*Primary Examiner*—Ellis P. Robinson
*Assistant Examiner*—Donald J. Loney
*Attorney, Agent, or Firm*—Calfee, Halter & Griswold

[57] ABSTRACT

A method of producing a packing product includes the steps of feeding at least one sheet of material in a first direction; cutting the at least one sheet of material into a plurality of strips; the cutting being performed by rotating two sets of alternating, overlapping cutting discs; the feeding of the at least one sheet of material being between the two sets of cutting discs; advancing each of the strips by the rotating of at least an outer surface of a corresponding one of the cutting discs as the outer surface moves in the first direction; restricting each strip from continued advancing in the first direction; and sequentially folding each of the strip means by the restricting in opposition to the advancing. There is included apparatus and means for producing the packing product. Additionally, the resulting packing product includes a plurality of narrow, elongated strips of material; the material having a natural resilience; and each of the strips including a plurality of transverse folds against the natural resilience to form a longitudinally compressed strip element.

35 Claims, 10 Drawing Sheets

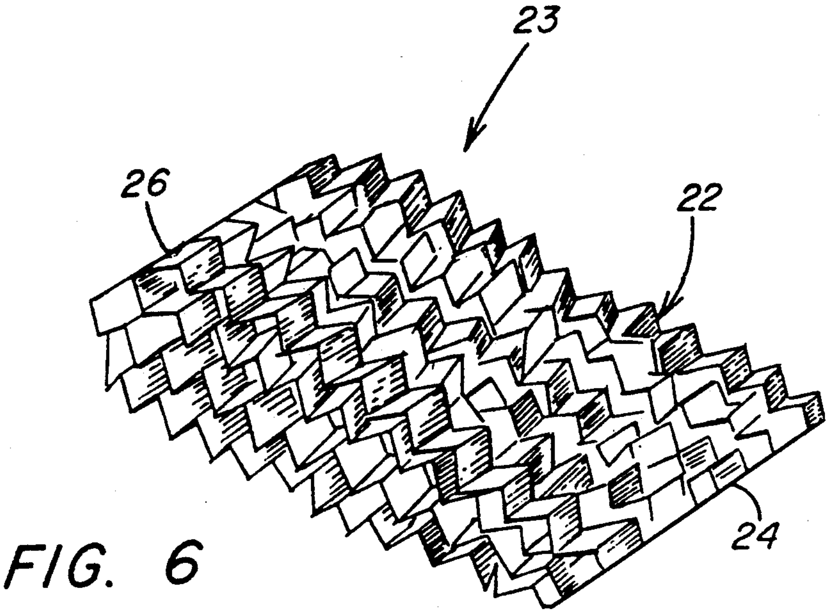
FIG. 6
FIG. 7
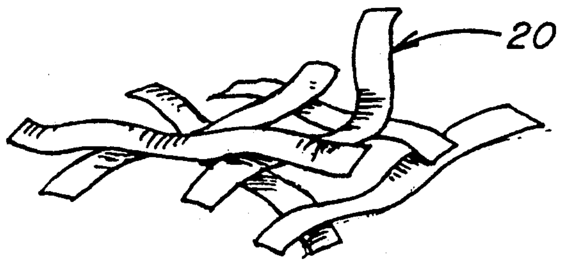
PRIOR ART
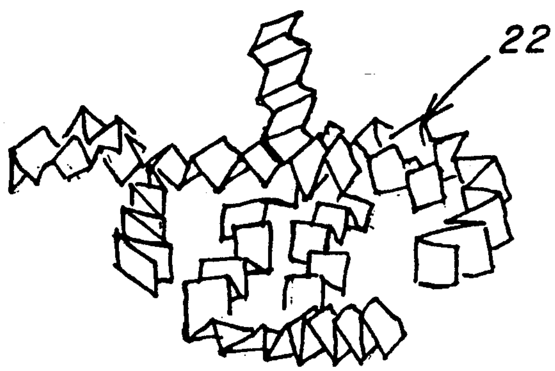
FIG. 8

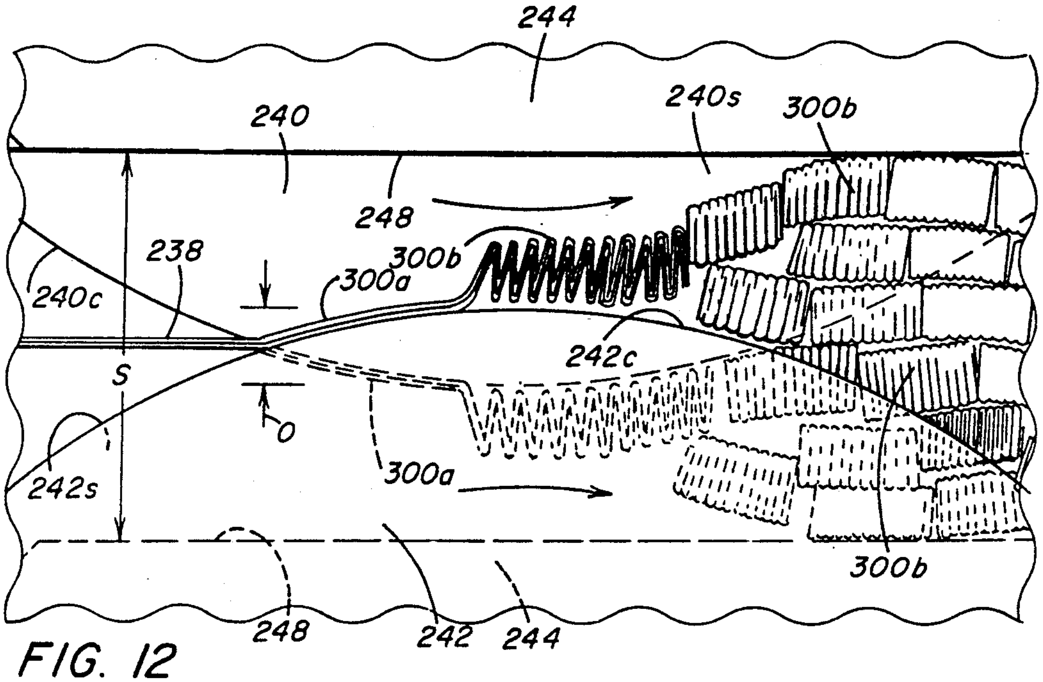
FIG. 12
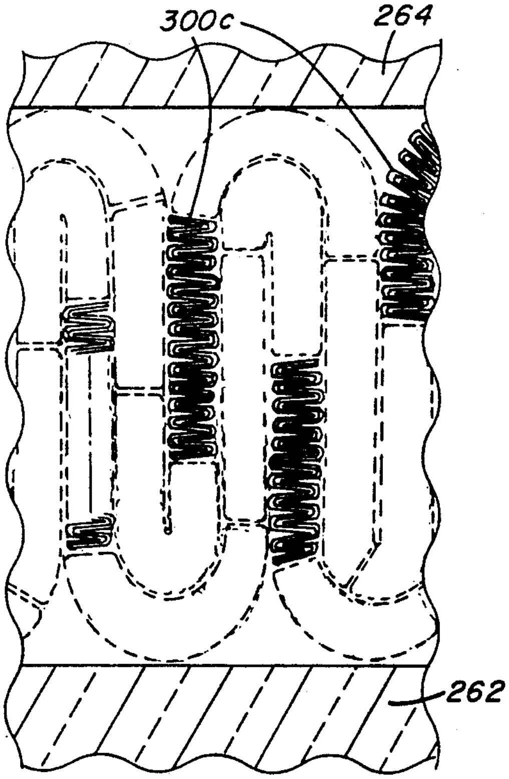
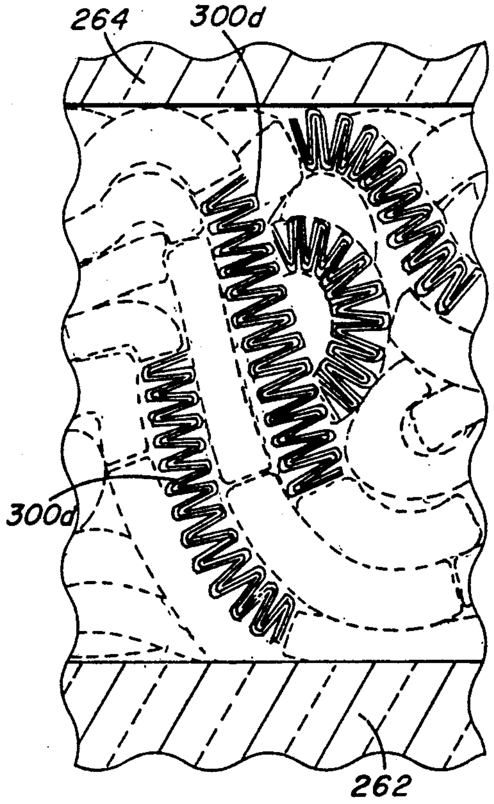
FIG. 14

RESILIENT PACKING PRODUCT AND METHOD AND APPARATUS FOR MAKING THE SAME

This application is a continuation-in-part of prior application Ser. No. 07/430,861, filed on Nov. 2, 1989, which issued as U.S. Pat. No. 5,088,972 on Feb. 18, 1992.

BACKGROUND OF THE INVENTION

1. Field of the Invention:

The present invention relates to a resilient packing material or the like and to the method and apparatus for making the same. More particularly, this invention relates to apparatus and methods for resiliently folding and crimping shredded strips of sheet material into selected lengths of interlocking, bulk, packaging material.

2. Description of the Prior Art:

Styrofoam pellets or peanuts are commonly used within the wholesale and retail industries as bulk packaging material. The peanuts are used to position a product away from the interior sides of a container and fill the empty space located therebetween. The peanuts are intended to protect the packaged product against the impact of a blow or other mistreatment.

Dispensing styrofoam peanuts does not require a great degree of sophistication. The peanuts are simply gravity fed from large retainer bins into the empty spaces within a packaging container.

Use of styrofoam peanuts, however, has many drawbacks. For example, if styrofoam peanuts are used to protect a heavy object placed within a container, and such package is jostled and shaken, the object usually gravitates toward the bottom of the container and the peanuts float upward. Eventually the object comes to rest against the base or side of the container and damage to the object may occur. The light weight of the styrofoam peanuts also allows them to be easily blown by the wind and scattered.

Of particular concern, styrofoam peanuts are extremely difficult to dispose of and destroy after use. In fact, because of the extensive use of this nonbiodegradable product, which emits toxic gases if burned, styrofoam peanuts present a major threat to the environment and are being banned from an increasing number of communities.

Styrofoam peanuts are also dangerous to children and to wildlife who often mistake them as food and consequently ingest them. Styrofoam peanuts are not digestible and cause a major source of tracheal blockage in children.

Other packaging filler materials, such a shredded paper, have also been used. Shredded paper, however, usually lays flat within the container and a very large amount of paper is required to provide the bulk needed to fill the voids and to protect the contained object. To provide such a large amount of shredded paper is often cost prohibitive and, following its use, such voluminous amounts of paper must be disposed. In addition, the shock absorbency of flat shredded paper is minimal.

A number of patents are directed to the folding or crumpling of large sheets of materials. Specifically, U.S. Pat. Nos. 2,668,573; 3,150,576; and 4,012,932 are directed to the corrugation or pleating of large sheets of paper material.

Complicated sheet creping, crinkling or folding is disclosed in U.S. Pat. Nos. 1,680,203 and 3,501,565. However, U.S. Pat. No. 3,501,565 simply includes preliminary steps prior to the stretching of plastic sheet material or the like.

Other patents discuss the crumpling of sheet paper material or the like for the formation of filters. U.S. Pat. No. 2,786,399 includes such crumpled sheet paper material and employs a cutter for the formation of small blocks of such material. U.S. Pat. No. 2,924,154 is directed to filter material and employs a gate means during the advancement of the sheet material to assist in the formation of the crumpled blocks of material.

Various methods and apparatus for forming dunnage are disclosed in several patents which include the folding or funneling of sheet paper or material into a compact elongated form. U.S. Pat. Nos. 3,509,797; 3,613,522; and 3,650,877 include such elongated dunnage material which is twisted and compressed to provide a helical shape. U.S. Pat. Nos. 4,085,662; 4,650,456; and 4,699,609 disclose additional devices for the folding and collapsing of elongated sheet material. Some of these patents directed to dunnage include cutter means at the outlets in order to provide predetermined lengths of the dunnage material.

U.S. Pat. Nos. 3,754,498 and 4,201,128 generally disclose shredding machines which are used in conjunction with compacters or bailers.

U.K. Patent No. 771,877 and U.S. Pat. No. 3,217,988 disclose cutting discs for producing a longitudinal cut of sheet material to form longitudinal strips. Outlet support means is provided for supporting the longitudinal strips during a transverse cut to form smaller pieces.

U.S. Pat. Nos. 2,621,567; 2,686,466; and 2,770,302 disclose shredding devices which include a comber configuration for imparting a bend or kink to the strips which are cut thereby.

It is felt that the known prior art taken alone or in combination neither anticipate nor render obvious the present invention. These citations do not constitute an admission that such disclosures dare relevant or material to the present claims. Rather, these citations relate only to the general field of the disclosure and are cited as constituting possible prior art for consideration.

OBJECTS OF THE INVENTION

It is the general object of the present invention to provide apparatus and methods for rapidly folding large quantities of shredded strips or strands of sheet material into continuous or segmented lengths of folded and crimped, interlocking, bulk packaging material, such apparatus being: sturdy and durable in design; compact; easily constructed; inexpensive to manufacture; and economical and simple to operate.

A further object is to provide one embodiment of the invention including apparatus and methods for producing large quantities of folded and crimped, shredded strips of sheet material which: avoid interference with the otherwise normal operation of conventional shredding device; does not require permanent modification of the shredding device's structure, or defacement or mutilation thereof; and may be used on any commercial shredding device, irrespective of its design or general configuration.

A still further object is to provide apparatus and methods for a commercial shredding device which allows for quick and easy adjustment of the device to selectively extend or shorten the length of the shredded, folded, and crimped strips of sheet material into segment lengths which would otherwise be commercially impossible, and to do so without requiring modification of the devices's mechanics, or any careful or critical attention by the operator.

Another object is to produce a series of folded interlocking strips of bulk packaging material which are produced from colored sheet material and may be made from a large variety of different colors or controlled combinations of colors.

Another object is to produce the folded, interlocking strips from biodegradable pulp materials such as from paper, cardboard, and the like, the composition of which may be edible and is approved by the U.S. Federal Food and Drug Administration (FDA) for use in packaging edible products.

It is also an object of the present invention to provide another preferred machine which is particularly adapted for and capable of producing the desired packing product.

It is also an object to provide such a machine which feeds sheet material to a cutting section for the sequential folding of longitudinal strip means formed in the cutting section.

It is a further object of the invention to produce the strip means of material having a natural resilience so that the sequential folding causes the strip means to be longitudinally compressed and capable of resilient expansion during use.

It is yet another object of the invention to provide an overall packing product comrising a plurality of intertwined and intermixed strip means which have been longitudinally compressed in order to provide overall resilience and resistance to compression of the packing product.

SUMMARY OF THE INVENTION

The present invention achieves these general and specific objects and presents new apparatus and methods for producing a bulk packaging material which incorporates therein the beneficial features of both styrofoam peanuts and shredded paper. The present invention also overcomes each of the previously mentioned disadvantages.

In short, this invention provides apparatus and methods for rapidly producing large quantities of bulk packaging material comprising folded and crimped, interlocking strips of sheet material which may:

(a) be used as a resilient padding to cushion and prevent heavier objects from gravitating toward the bottom and/or sides of a container, such padding requiring a lesser amount of raw material to form a greater amount of interlocking bulk packaging material than was previously available;

(b) be produced with selectable lengths, smaller lengths capable of being gravity fed into an container to fill the void left by the banning of styrofoam peanuts, larger lengths capable of being wrapped around a product to provide a secure protective cushion;

(c) be produced in selectable colors and/or controlled color combinations for decorative and aesthetic purposes;

(d) be manufactured from biodegradable material, such as pulp material (i.e., paper, cardboard, or the like); and (e) be edible and/or approved by the U.S. Federal Food and Drug Administration (FDA) for use in packaging edible products.

One embodiment of the invention can comprise an attachment for a commercial shredding machine or device. Such an attachment can be a simple, compact, rugged, inexpensive, movable barrier which is easily attached and employed. In this embodiment, the present invention does not necessarily require the defacement or alteration of the shredding device's structure. In essence, the attachment modifies the shredding device to cause a sheet material, such a mylar, paper, cardboard, or the like, which is fed therethrough, to be impacted or impelled against a barrier after having passed through a series of cutting blades in the shredding device.

The barrier causes the shredded sheet material to become controllably jammed between the barrier and the cutting blades. The continued rotation of the cutting blades forces additional amounts of sheet material into the shredding machine and cutting blades. As a result, each shredded strip of sheet material is folded against itself in a relatively controlled manner, thereby, repetitively folding and crimping or creasing each strip and compacting it within a confined space or area against a remaining dam of jammed shredded strips. The resulting effect is the folding or crimping of each cut strip into an accordion-shaped mass.

The confined area referably is located near an exit opening of the shredding device through which the shredded strips pass.

As pressure builds up behind the confined mass of shredded strips, a pressure sensitive gate, in one embodiment, opens to allow the escape of a portion of the jammed strips. The gate controllably maintains the confinement of a remaining portion of jammed strips within the confined area. The gate thus allows the continuation of additional lengths of shredded sheet material to be folded and pressed against the remaining dam of jammed strips without the modified device actually becoming jammed to the point of requiring servicing.

This means for controllably jamming the paper within the confined area may comprise a simple, movable barrier which is placed near the exit opening of the shredding device. The barrier causes the shredded strips of sheet material to temporarily remain within a confined area located between the barrier and the cutting blades of the shredding device.

The confined area may be of a fairly small or large volume, the boundaries of which are initially defined by the barrier, the cutting blades, and possibly a lower, upper, and side support elements. After a partial dam of shredded strips has been achieved, the dam itself further limits the volume of space remaining within the confined area. As long as a partial dam of shredded strips remains within the confined area, such shredded strips serve the purpose of the movable barrier, and may even eliminate the need for continued use of the gate barrier.

In its simplest form, the barrier comprises a movable gate which is urged toward a closed position. The gate serves to hinder the exit of the shredded strips and to confine the strips into a partially jammed state. As additional amounts of sheet material are fed or pulled into the shredding device, the expelling force of the shredding device forces the shredded strips into the confined area. Once the pressure forcing the jammed strips into the confined area overcomes the means for urging the gate into a closed position, the gate is urged open to allow a portion of the folded and crimped strips to escape.

Various methods and apparatus may be used to urge the gate toward its closed position and thereby retain the shredded strips within the confined area. For example, a weighted, hinged gate may be used. Other embodiments include the use of a pivotal gate which is urged toward its closed position by a spring or by a hydraulic or pneumatic piston.

Once the folded and crimped strips of sheet material are formed, the strips may be deposited within a receiving bin.

Alternatively, upon leaving a confined area, located immediately adjacent to the cutting blades, the compressed state of the folded and crimped strips may be maintained by forcing the strips to travel through a confined conduit. A second cutting device or shearing device may be located at some point along the length of the confined conduit or at the end thereof. The shearing device may be engaged to cut or shear the compacted, folded and crimped strips into segments.

Continued insertion of additional lengths of sheet material into the shredding device at a regulated rate naturally causes the folded strips to exit the shredding device at a similar regulated rate. If the strips are passed through the confined conduit and a shearing device is used, the shearing device may be activated at preselectable time intervals to shear, cut, or dissect the compressed, crimped strips traveling within the confined conduit into various segment lengths. This process enables the formation of crimped strips of material having any desired length from 100 foot lengths or greater to segments of one or two inches or smaller.

If a plurality of layers of sheet material are passed through the shredding device at one time, the shearing device forces each layer against an adjacent layer with a tremendous force. This force is necessary to cause the multiple layers of sheet material to sheer. Such compression, however, has an added benefit of sealing together or partially bonding the sheared ends of the juxtaposed and sheared strips. The bonding of each overlapping layer of sheet material to the proximately juxtaposed sheet material assists in maintaining the structural integrity the interlocking folded and crimped strips. Thus, a plurality of layered, shredded, folded and crimped strips of sheet material may be cut into short segments that are bonded at each terminal end thereof. These shorter segments serve very well to replace the use of styrofoam peanuts. Such shorter segments may also be used in existing gravity feed systems.

Longer lengths of the shredded, folded and crimped strips may be used for decorative effects at parties and/or window or room displays.

The longer lengths of the folded strips may also be used as bulk padding and packing material. When so used, the object to be protected may be liberally and literally wrapped within multiple lengths of interconnecting and interlocking folded and crimped, shredded strips.

Because the ridges of the paper strips interlock with one another, the strips hold their form and greatly increase the volume of space they occupy. Thus, the use of a smaller amount of paper is required to protect a particularly packaged object. The shock absorbency of the packing material is also substantially increased, since the impact of a blow is disbursed throughout each interacting ridge or web of the interconnecting folded strips. The folded and crimped status of the strips of the present invention allows for a substantially greater degree of interlocking effect and shock absorbency than do the kinked strips described in U.S. Pat. Nos. 2,621,567; 2,686,466; and 2,770,302.

If paper sheet material is used, the longer lengths of crimped, shredded strips may be placed within a retainer bin or hopper and a selected amount of bulk packaging material may be torn therefrom. This enables an operator to use an exact amount of desired packaging material, and thereby reduce waste.

Another important, added benefit of the present invention is the ability to use a variety of colors in the production of the shredded, folded and crimped strips. This enables the inventor to produce bulk packaging material of the present invention having the chosen colors of a particular store, company, or corporation. This is accomplished by simply using a sheet material having the desired color.

A combination of colors may also be used. Two or more differently colored sheets of material may be passed into the shredding machine to produce a variety of color combinations. The only limiting factor is the capacity of the shredding machine. For example, a first percentage of one color (such as 23% of dark blue) and a second percentage of another color (such as 77% of light blue) may be used. Thus, folded and crimped strips of packaging material may be produced with any number of colored sheet material combinations.

Printed, embossed, or any other means of identification may also be affixed to the sheet material which is shredded. Preferably, such printing locates the printed matter longitudinally along each length of shredded strip. Thus, a store, company or corporation may have its name, logo, trademark, or other subject matter, listed along each individually crimped strip.

Another important benefit is that recyclable, biodegradable sheet material may be used. By using pulp materials, such as paper and/or cardboard which breakdown and decompose quickly, the detriment to the environment by disposal of such material is minimized.

Depending upon the composition of the sheet material, the environment may even be enhanced by the discarding of such packaging material. For example, fertilizers or other beneficial additives may be incorporated into the sheet material. These benefits are in stark contrast to the damage caused by the diposal of styrofoam peanuts.

Existing apparatus and methods for packaging food products often cause substantial damage to the very products they are intended to protect. For example, existing apparatus and method for packaging flash frozen fish often cause scarring to appear on the fish. This difficulty is greatly overcome by the present invention because when the folded and crimped strips of the present invention are made from paper and are exposed to moisture, the folded strips conform to the contour of the object being packaged. This provides a more uniform and larger support framework for the object and scarring is eliminated, or at least substantially reduced.

Edible sheet material and sheet material which has been approved by the U.S. Food and Drug Administration (FDA) for use in packaging edible, or at least consumable, products may also be used. Thus, the wholesale and retail food industries are now provided with apparatus and methods for packaging food products which have been hence unavailable.

Additional uses for the crimped sheet material include using it a bulk material for starting worm composts and/or animal bedding.

The apparatus which produces such as universal bulk packaging material is inexpensive, and is easily manufactured. Operation of the apparatus is also extremely simplistic and may be accomplished by an unskilled worker.

The various objects of the invention are also provide by a preferred embodiment thereof including a method of producing a packing product comprising the steps of: feeding at least one sheet of material in a first direction; cutting the at least one sheet of material into a plurality of strip means; the cutting being performed by rotating two sets of alternating, overlapping cutting discs; the feeding of the at least one sheet of material being between the two sets of cutting discs; advancing each of the strip means by the rotating of at least an outer surface of a corresponding one to the cutting discs as the outer surface moves in the first direction; restricting each strip means from continued advancing in the first direction; and sequentially folding each strip means by the restricting in opposition to the advancing.

The sequential folding can occur adjacent the outer surface of the corresponding one of the cutting discs in a first of the two sets and between adjacent cutting discs in a second of the two sets. The sequential folding is against a natural resilience of the material of the strip means.

The sequential folding produces a plurality of folds of the strip means with adjacent folds being in opposite directions. The sequential folding of the plurality of folds is against natural resilience of the material to produce biasing at each of the folds tending to separate adjacent longitudinal portions of the strip means which are adjacent to each fold. The sequential folding of each strip means produces a longitudinally compressed strip means. The method further includes primarily collecting a plurality of the longitudinally compressed strip means between the two sets of cutting discs after the cutting and sequential folding. The method further includes additional collecting of an additional plurality of the longitudinally compressed strip means in a discharge chute remote from the two sets of cutting discs. The additional collecting produces resistance to movement of the plurality of longitudinally compressed strip means from the collecting and the collecting of the longitudinally compressed strip means causes the restricting of each strip means to cause the sequential folding.

The feeding includes simultaneously feeding a plurality of the sheets of material, the cutting of each strip means produces layers of strips of the material in the strip means, and the sequential folding causes substantially aligned folds of the plurality of folds respectively in each strip of the layers of strips.

The method includes the feeding which includes directing the material from a roll toward the two sets of cutting discs and transversely cutting the material in a direction which is transverse to the first direction to provide each of the at least one sheet of material prior to the cutting. The directing includes simultaneously directing a plurality of layers of the material and the transversely cutting forms a plurality of sheets of the material for the cutting.

The various objects are also provided by apparatus for producing a packing product comprising: means for feeding at least one sheet of material in a first direction; means for cutting the at least one sheet of material into a plurality of strip means; the means for cutting including two rotating sets of alternating, overlapping cutting discs; the means for feeding including means for directing the at least one sheet of material between the two rotating sets of cutting discs; means for restricting each of the strip means formed by the means for cutting; and the means for restricting for causing sequential folding of each strip means.

The means for feeding can include means for initially directing the material from a supply of the material and means for transversely cutting the material to form the at least one sheet of material. The means for feeding can be for feeding a plurality of layers of the material in the at least one sheet of material. Each of the cutting discs can include a cylindrical outer surface.

The preferred means for cutting includes a plurality of combers, each of the combers of the plurality being respectively aligned with each of the cutting discs, each comber having a facing end which is adjacent the strip means after formation thereof by the means for cutting, and the facing ends of the combers defining an area of passage of the strip means through the means for cutting. The facing ends of the combers can be substantially parallel.

The means for restricting each strip means includes a discharge chute extending from the means for cutting. The apparatus can further include means for adjusting the means for restricting each strip means. The discharge chute can include wall means and the means for adjusting can include means for angularly adjusting the wall means of the discharge chute. The combers can include extension for directing each strip means substantially in the first direction into an interior of the discharge chute.

Still further, the objects of the invention are provided by a packing product comprising; a plurality of narrow, elongated strip means of material; the material having a natural resilience; and each of the strip means including a plurality of transverse folds against the natural resilience to form a longitudinally compressed strip means. A majority of the folds includes an acute angle. The material of the longitudinally compressed strip means can include a plurality of layers. The longitudinally compressed strip means are biased to longitudinally expand. The longitudinally compressed strip means are intertwined and interlocked to combine and form a resilient mass of the packing product. Each of the longitudinally compressed strip means includes substantially planar portions adjacent to each of the folds of the plurality of folds. Each longitudinally compressed strip means can include a predetermined width dimension and a majority of the planar portions can include a length dimension which is between the predetermined width dimension and twice the predetermined width dimension.

These and other objects and advantages of the present invention will become more readily apparent upon reading the following disclosure and referring to the attached drawings.

BRIEF DESCRIPTION OF THE DRAWINGS

FIG. 6 is a simplified, isometric view of a plurality of bonded segments of folded, crimped, interlocking strips of shredded sheet material which is a product of the present invention.

FIG. 7 is an simplified, isometric view of strips of shredded paper as found in the prior art.

FIG. 8 is a simplified, isometric view of a plurality of folded, crimped, interlocking strips of shredded sheet material as produced by the present invention.

FIG. 12 is an enlarged, fragmentary view of the cutting area of the embodiment of FIGS. 9, 10 and 11.

FIG. 13 is a fragmentary, sectional view as seen along line XIII—XIII of FIG. 11.

FIG. 14 is a fragmentary, sectional view as seen along line XIV—XIV of FIG. 11.

Figure 1:
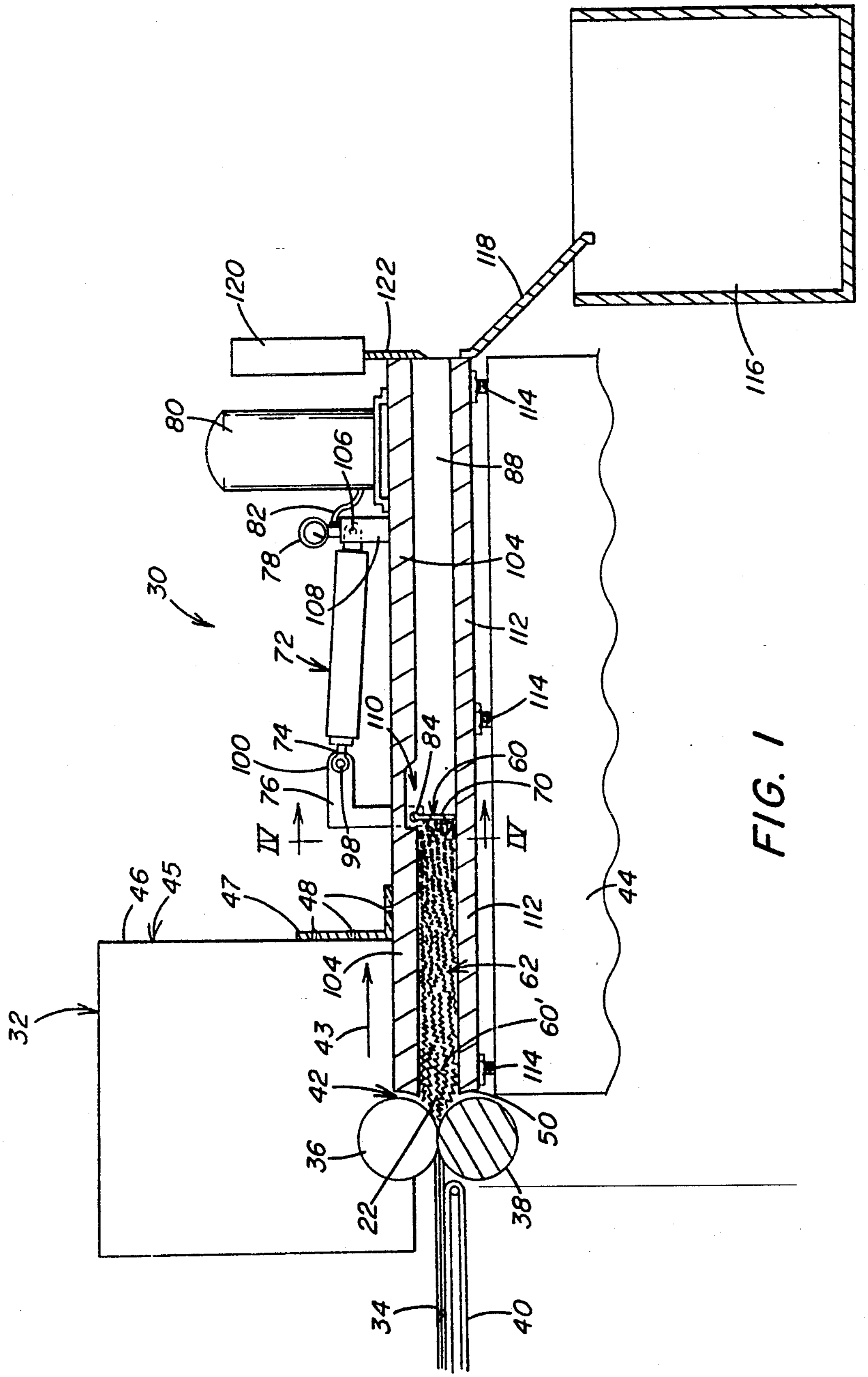
FIG. 1 is a simplified, partial, cross-sectional, side elevational view of one preferred embodiment of the present invention wherein a hinged gate is shown located in a closed position to serve as a barrier.

One should understand the drawings are not necessarily to scale and the elements are sometimes illustrated by graphic symbols, phantom lines, diagrammatic representations, and fragmentary views. In certain instances, the drawings have omitted details which are not necessary for an understanding of the present invention or which render other details difficult to perceive. For example, the preferred embodiment of FIGS. 1 and 2 typically includes cutting blades which are mounted for rotation on two parallel shafts and which have serrated cutting edges, neither of which are specifically shown in the drawings. Additionally, the embodiment of FIGS. 1 and 2 generally employs the type of cutting or shredding machine which typically includes comb teeth, spacers, combers or strippers between the cutting blades on each rotating shaft but have also been eliminated to simplify the drawings.

DESCRIPTION OF THE PREFERRED EMBODIMENTS

Referrings to the drawings and particularly to FIG. 7, wherein like numerals indicate like parts, the prior art generally teaches that sheets of paper may be cut into elongated strips 20. Strips 20, however, do not provide very much resiliency or forgiveness when subjected to a blow or other mistreatment. A large number of strips 20 are required to fill a given empty space.

FIG. 8 illustrates a plurality of shredded, elongated, interconnecting strips 22 which have been folded and crimped using the apparatus and methods as taught herein. The folds within crimped strips 22 interlock with one another to form a resilient mass of intertwined and interconnected strips of decorative or bulk packaging material. The folds also form a variety of differently angled flanges and/or webbing which distribute any blow or impact received in a disbursed manner throughout each interconnecting fold of the interlocked crimped strips 22. Such folds also cause crimped strips 22 to occupy a greater volume of space, using a smaller amount of sheet material, than would otherwise be required.

FIG. 6 illustrates a plurality of shredded, elongated, interconnecting strips 22 which have been folded, crimped, and sheared into strip segments 23. Strips 22 have also been bonded together at a forward terminal end 24 and a rearward terminal end 26 thereof to form strip segment 23.

FIG. 1 illustrates one preferred embodiment of a crimping apparatus 30 which may be attached to a readily available commercial shredding device 32 which is shown in simplified form. In one embodiment of the invention, any appropriate shredding device 32 may be used.

Various shredding devices 32 are well known in the prior art and need not be further described herein except to mention that sheet material 34 is fed into a plurality of parallel cutting blades 36 and 38 which rotate therein, cutting sheet material 34 into a plurality of strips 20.

A conveyor belt 40 may be used to support and urge sheet material 34 into cutting blades 36 and 38. Conveyor belt 40 may be free rolling or be powered by a motor (not shown).

Figure 2:
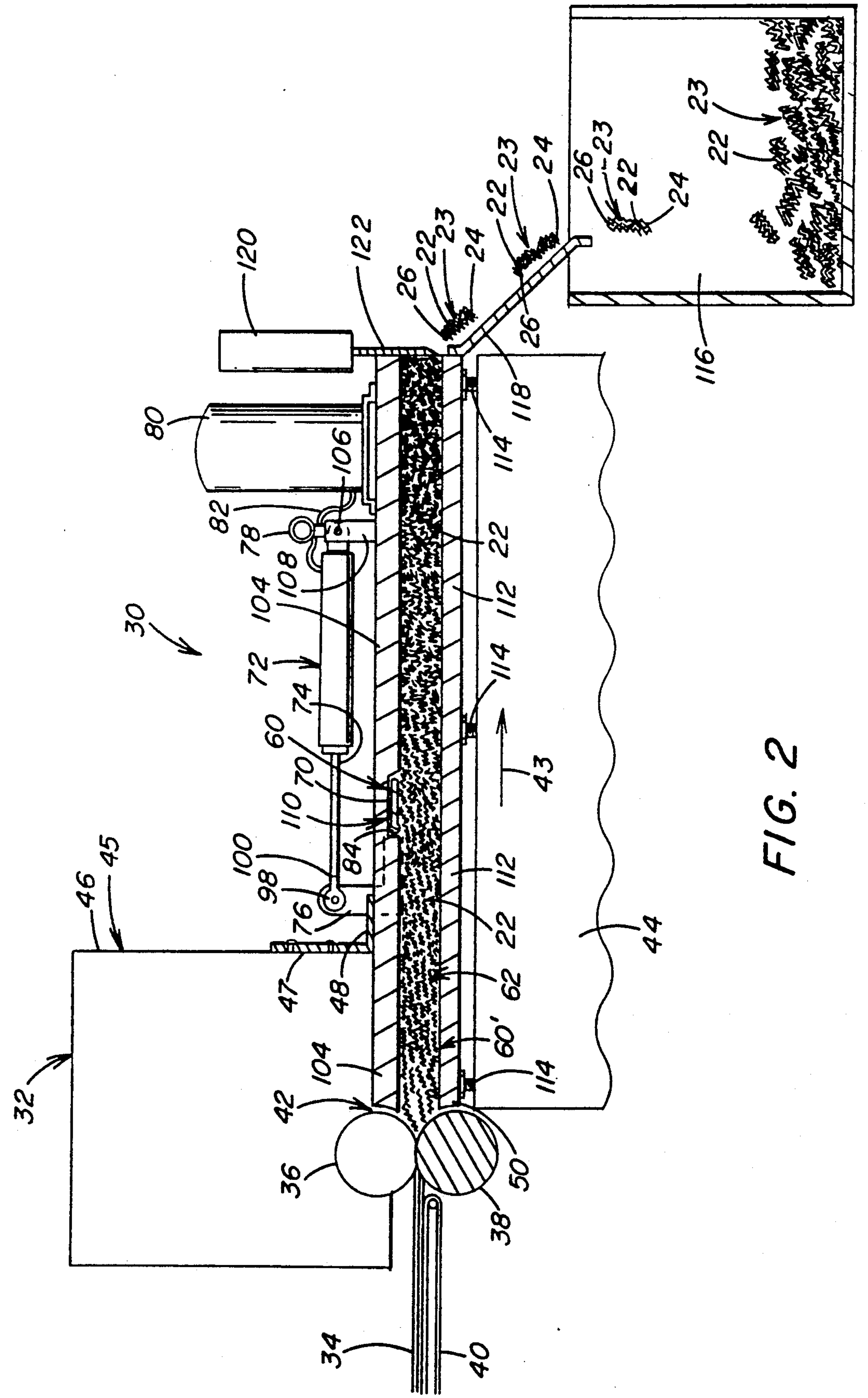
FIG. 2 is a simplified, partial, cross-sectional, side elevational view of the apparatus shown in FIG. 1, wherein the gate is urged away from its closed position.

Preferably, in the embodiment of FIGS. 1 and 2, the cutting blades 36 and 38 are serrated cutting blades which facilitate easy shredding of sheet material 34 and which assist in pulling sheet material 34 into shredding device 32 once sheet material 34 engages cutting blades 36 and 38.

When passed between cutting blades 36 and 38, sheet material 34 is cut into elongated strips 20 which are then directed toward, and expelled outwardly from, and exit opening 42 of shredding device 32. Strips 20 are generally expelled through exit opening 42 at a very rapid rate. In this preferred embodiment, strips 20 are expelled from exit opening 42 along a path generally indicated by arrow 43 at a rate of about 125 feet per minute.

Crimping apparatus 30 is primarily a simple, durable, easily constructed, and inexpensive attachment for shredding device 32 which may be easily attached and employed.

Attachment of crimping apparatus 30 to or near shredding device 32 may be accomplished by any appropriate means, and does not necessarily require permanent modification or defacement of shredding device 32. For example, crimping apparatus 30 may be attached or secured to an elevated stand or support member 44, which is attached to an underlying structure (not shown) and/or has sufficient weight to resist movement. The bulk of the weight of crimping apparatus 30 may rest upon support member 44. Thus attached, crimping apparatus 30 may be properly positioned near exit opening 42 without even being attached to shredding device 32.

Alternatively, crimping apparatus 30 may be physically secured to shredding device 32. For example, crimping apparatus 30 may be removably attached to a structural framework 45 of shredding device 32 by any appropriate support means. As shown in FIGS. 1 and 2, crimping apparatus 30 is removably attached to he enclosure of shredding device 32, such as to a rear wall 46, by means of a supporting bracket 47, such as a section of angle iron. Means for removably attaching supporting bracket 47 to crimping apparatus 30 and to structural framework 45 of crimping apparatus 32 may comprise a plurality of removable screws 48, bolts, or the like. If used as an optional or retrofit attachment, crimping apparatus 30 is positioned adjacent to exit opening 42. If space within shredding device 32 allows, a forward end 50 of crimping apparatus 30 is positioned immediately adjacent to an expulsion side of cutting blades 36 and 38.

Shredding device 32 may also be specifically designed to incorporate therein the subject matter of this invention, alleviating the need for an attachment.

Crimping apparatus 30 modifies shredding device 32 to cause sheet material 34, which may be made of mylar, paper, carboard, or the like, and is fed therethrough, to be initially impacted or impelled against a barrier 60 after passing between cutting blades 36 and 38. Barrier 60 causes the shredded strips 20 to assume a partially jammed state within a compression chamber or confined area 62 located between barrier 60 and cutting blades 36 and 38.

Continued shredding of additional sheet material 34 by shredding device 32 forces additional elongated strips 20 into confined area 62 forming a dam or temporarily jammed strips 20. Once a dam of shredded strips 20 is formed, the front of the dam, which is located most closely to cutting blades 36 and 38, serves itself as a barrier 60'. As additional amounts of sheet material 34 are fed or pulled into shredding devices 32, the expelling force exerted by cutting blades 36 and 38 forces strips 20 into confined area 62. As strips 20 are forced against barriers 60 or 60', strips 20 are confined within confined area 62 and are forced to fold against themselves in a relatively controlled manner. Such folding and further insertion of strips 20 into confined area 62, causes the folded strips to become compacted against themselves and each other, thereby creating crimped strips 22. The compaction of strips 20 within confined area 62 causes strips 20 to be crimped at each fold. Continued insertion of strips 20 into confined area 62 against barrier 60 or 60' repetitively, and relatively uniformally folds and crimps each strip 20 into an accordion-shaped mass of crimped strips 22.

The function of crimping apparatus 30 is to serve as a pressure sensitive barrier 60 which is capable of temporarily damming the passage of strips 20 which are expelled from shredding device 32. Toward this end, crimping apparatus 24 is provided with a means for urging barrier 60 toward a closed position.

Figure 3:
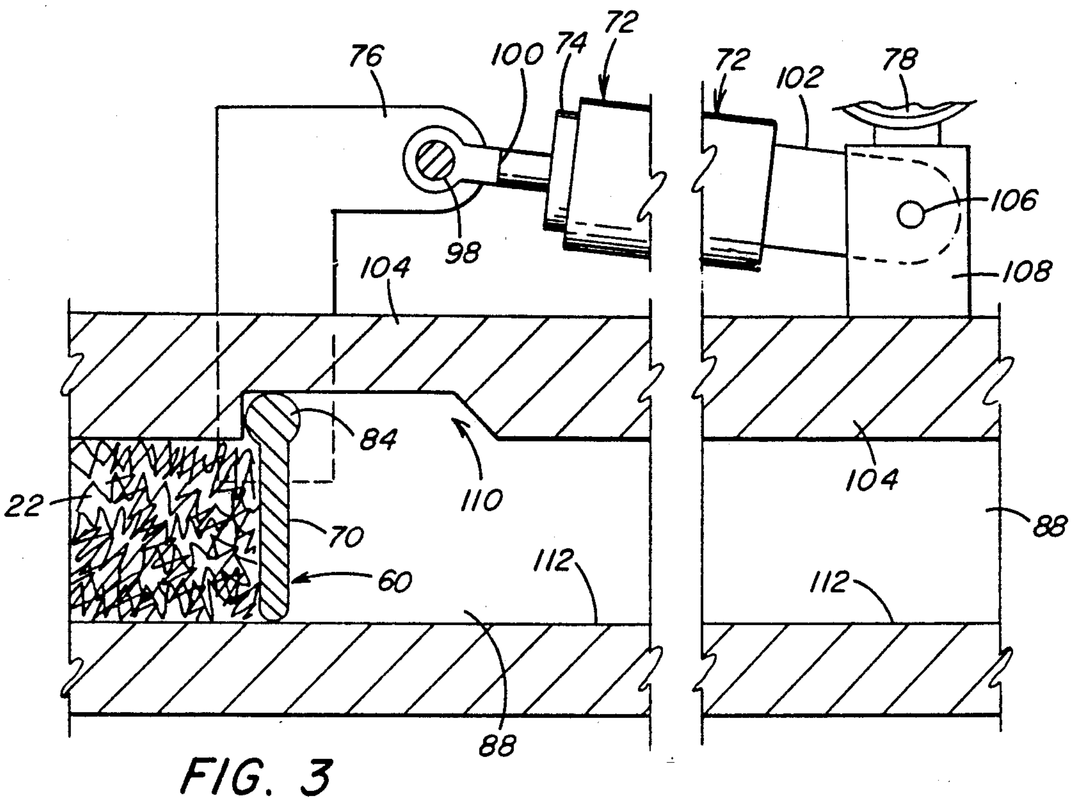
FIG. 3 is an enlarged, partial, cross-sectional, side elevational view of the gate in its closed position.

In its preferred embodiment, barrier 60 comprises a compression door gate 70 having a closed position located within a generally vertical plane, and an open position, located within a generally horizontal plane. FIGS. 1 and 3 illustrate gate 70 in a closed position. FIG. 2 shows gate 70 in an open position.

Initially gate 70 is urged towards its closed position by an urging means 72. Urging means 72 may comprise a spring, a weight, or a pneumatically or hydraulically controlled piston 74 which is connected to gate 70 by a linkage means 76. The force exerted by urging means 72 upon gate 70 may be controlled by either the type of characteristics of the spring that is used, or by a valve means 78 that is attached to piston 74. If piston 74 is used, a fluid or air pressure reservoir 80 may also be provided and appropriately connected to the piston by means of a hose 82. Electronic pressure sensors may also be used to determine the amount of pressure which is being exerted upon gate 70 and to activate and/or release urging means 72 when needed.

Figure 4:
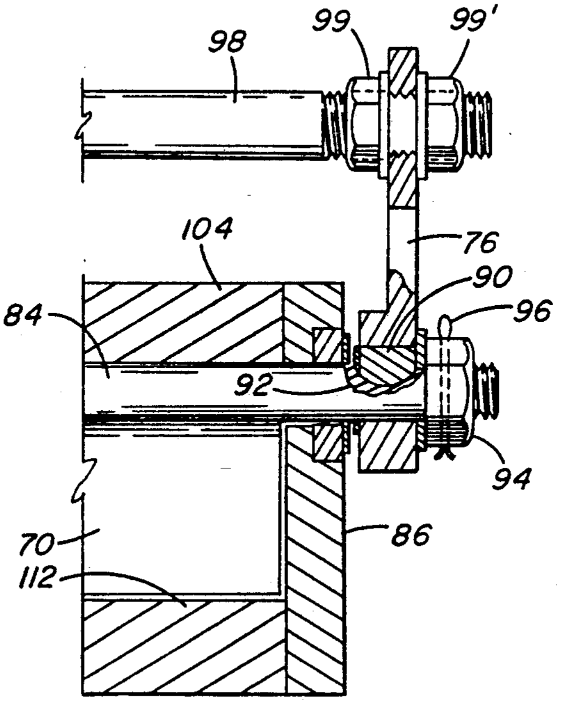
FIG. 4 is an enlarged, fragmentary, cross-sectional, front elevational view taken along line IV—IV in FIG. 1.
Figure 5:
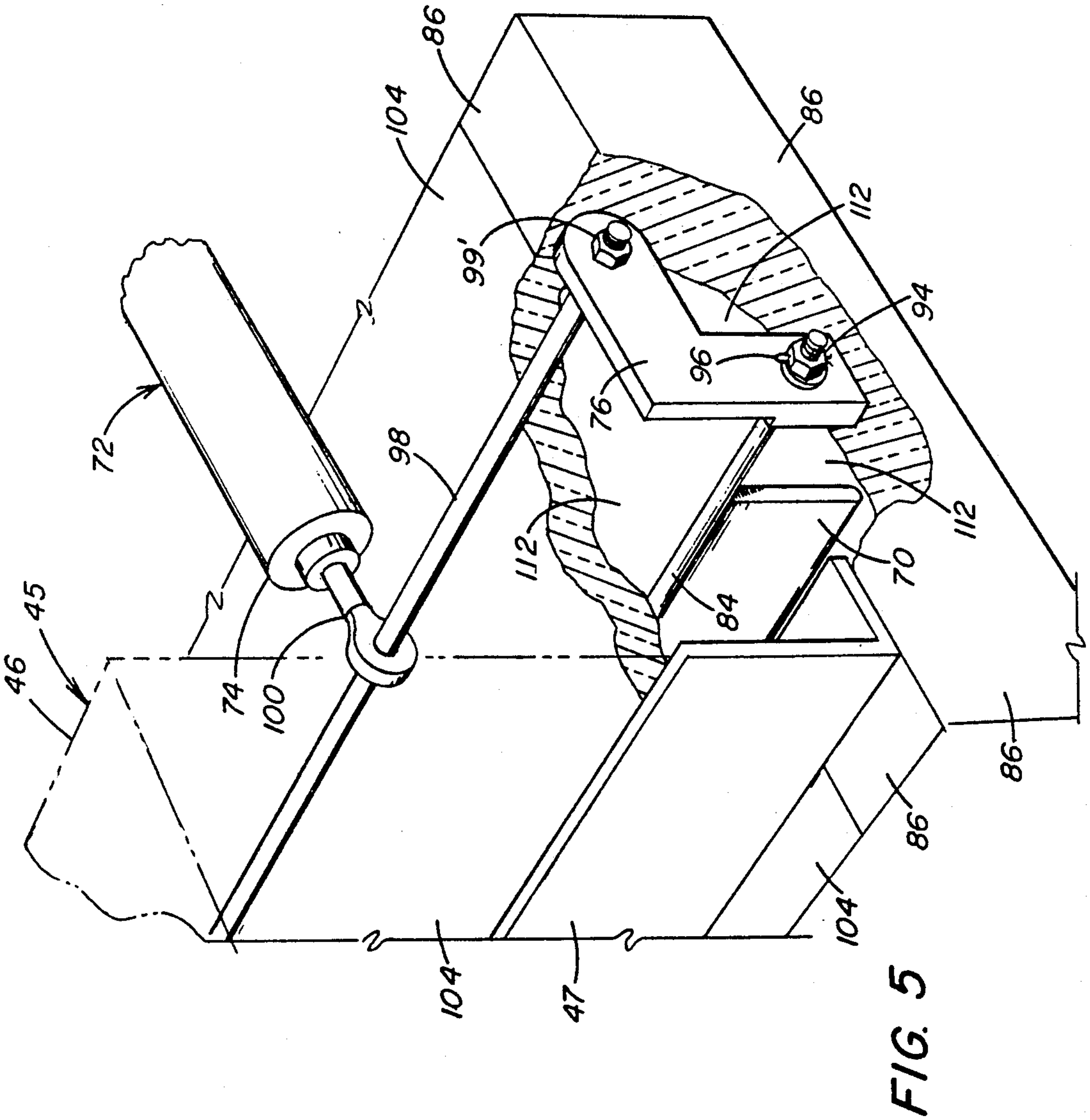
FIG. 5 is an enlarged, fragmentary, isometric view of the preferred embodiment shown in FIG. 1.

FIGS. 3 and 4 illustrate the attachment and function of gate 70, linkage means 76, and piston 74. Gate 70 spans the width of confined area 62 and is attached to a compression door shaft or pivotal rod 84. Pivotal rod 84 allows gate 70 to rotate between it open and closed position. Pivotal rod 84 may pass through side walls 86 and 88 which help define confined area 62. Pivotal rod 84 may be operationally secured to linkage means 76 by a key element 90 which is placed within a keyway 92 provided within pivotal rod 84 and linkage means 76. Linkage means 76 may comprise an angle arm as illustrated in FIGS. 1 through 5. Linkage means 76 is secured to pivotal rod 84 by means of a locking nut 94 having a cotter pin 96 located therein to prevent loosening of locking nut 94. Linkage means 76 is then connected to a second rod 89 or connector rod by means of a pair of nuts 99 and 99'. Second rod 98 is attached to a first end 100 of piston 74. A second end 102 of piston 74 is connected to either the structure of crimping apparatus 30 itself, or to any other element which will facilitate the operation of piston 74. FIG. 3 illustrates second end 102 of piston 74 being attached to an upper wall 104, which further defined confined area 62, by means of a pin 106 and support brace 108.

A recess 110 may be provided within upper wall 104 adjacent to pivotal rod 84 so that gate 70 may be retained therein when located in its open position. Thus, pivotal rod 84 and gate 70 do not obstruct the flow of crimped strips 22 when gate 70 is located in its open position.

In this preferred embodiment, confined area 62 is defined by gate 70, side walls 86 and 88, upper wall 104, and lower wall 112, and by cutting blades 36 and 38. However, once a dam of partially jammed crimped strips 22 are located within confined area 62, the frictional resistance between crimped strips 22 and the interior surfaces of upper wall 104, lower wall 112, and side walls 86 and 88, provides sufficient retaining force to eliminate the need for gate 70. At this point, gate 70 may be automatically or manually raised to its open position as shown in FIG. 2. The remaining dam of crimped strips 22 serves the function of gate 70. Therefore, the use of gate 70 is required only temporarily, until a sufficiently large dam of partially jammed crimped strips 22 are contained within confined area 62.

Given the above statement, barrier 60 may comprise any obstacle which will cause a sufficiently large amount of crimped strips 22 to become partially jammed within confined area 62 to the point that the frictional resistance along the interior sides of confined area no longer require the use of barrier 60. Therefore, an alternative embodiment of barrier 60 may be a simple board or other object which temporarily simulates the occurrence of a jammed state. For example, a segment of wood, cardboard, or anything else that temporarily fills the void within confined area 62 will serve this function. A board may be used for this purpose. Or, alternatively, a given amount of previously produced strips 20 or 22 may be forced into confined area 62 to begin the above described process.

In addition, if it is desirable to increase the amount of frictional resistance between the crimped strips 22 and the interior side, upper, and lower walls of confined area 62, the volume of confined area 62 may be reduced. thus the same amount of sheet material 34 would be forced through a smaller area of confined area 62. This may be accomplished by providing lower wall 112 with a means 114 for raising lower wall 112 with respect to upper wall 104 and to side walls 86 and 88. For example, as shown in FIGS. 1 and 2, support member 44 may be provided with a vertically oriented bolt extending therefrom which may be rotated to force lower wall 112 upward with respect to the remaining elements of crimping apparatus 30.

In the preferred embodiment, upper, lower and side walls 104, 112, 86, and 88 are made from aircraft LEXAN, which is a very workable transparent material that enables an operator to view the status crimping apparatus 30 as a glass. Other materials such as steel, aluminum, wood, plastic, or the like may also be used.

Once crimped strips 22 have been formed they may pass through confined area 62 and be deposited with a receiving bin 116. If needed, a chute or ramp 118 may be used to facilitate the movement of crimped strips 22 toward and into receiving bin 116.

The length of crimped strips 22 may also be limited. For example, if sheet material 34 has a limited length, then once such sheet material 34 passes through shredding device 32 and crimping apparatus 30, the crimped strips 22 that are formed will necessarily have a limited length.

Alternatively, continuous lengths of sheet material 34 may be passed through shredding device 32 and crimping apparatus 30. The compacted state of the folded, crimped, and compressed strips 22 may be maintained through crimping apparatus 30 by means of requiring crimped strips 22 to travel along a path having a generally confined area. A cutting, chopping, or shearing device 120 may then be engaged at preselected intervals to cut the compressed strips 22 into strip segments 23. As shown in FIGS. 1 and 2, shearing device 120 may utilize a blade 122 to cut compressed crimped strips 22.

The length of crimped strips 22 may be controlled by: regulating the rate of passage of strips 22 through crimping apparatus 30; and/or regulating the rate or time interval between which blade 122 cuts strips 22. Thus, crimped strips 22 may be produces with lengths exceeding 100 feet or more with lengths of less than one inch (1").

As has been explained above, the chopping or shearing of multiple layers of crimped strips 22 may compress such layer so strips 22 against one another to an extent that bonding between the strips 22 occurs. Thus strips segments 23 may be produced.

Gate 164 is urged toward a closed, generally vertical position by a weight 166. The mass and location of weight 166 may be adjusted to control the force exerted by urging means 72. Weight 166 is secured to gate 164 in an unobtrusive location so as to not hinder the jamming, folding, and crimping effect of crimping apparatus 30. Gate 164, however, does hinder the exit of crimped strips 22 from confined area 62' until such exit is desired and/or necessary.

When gate 164 is located in its closed position, gate 164, lower wall 112', and rear wall 46 and/or cutting blades 36 and 38 define the boundaries of confined area 62'.

Figure 10:
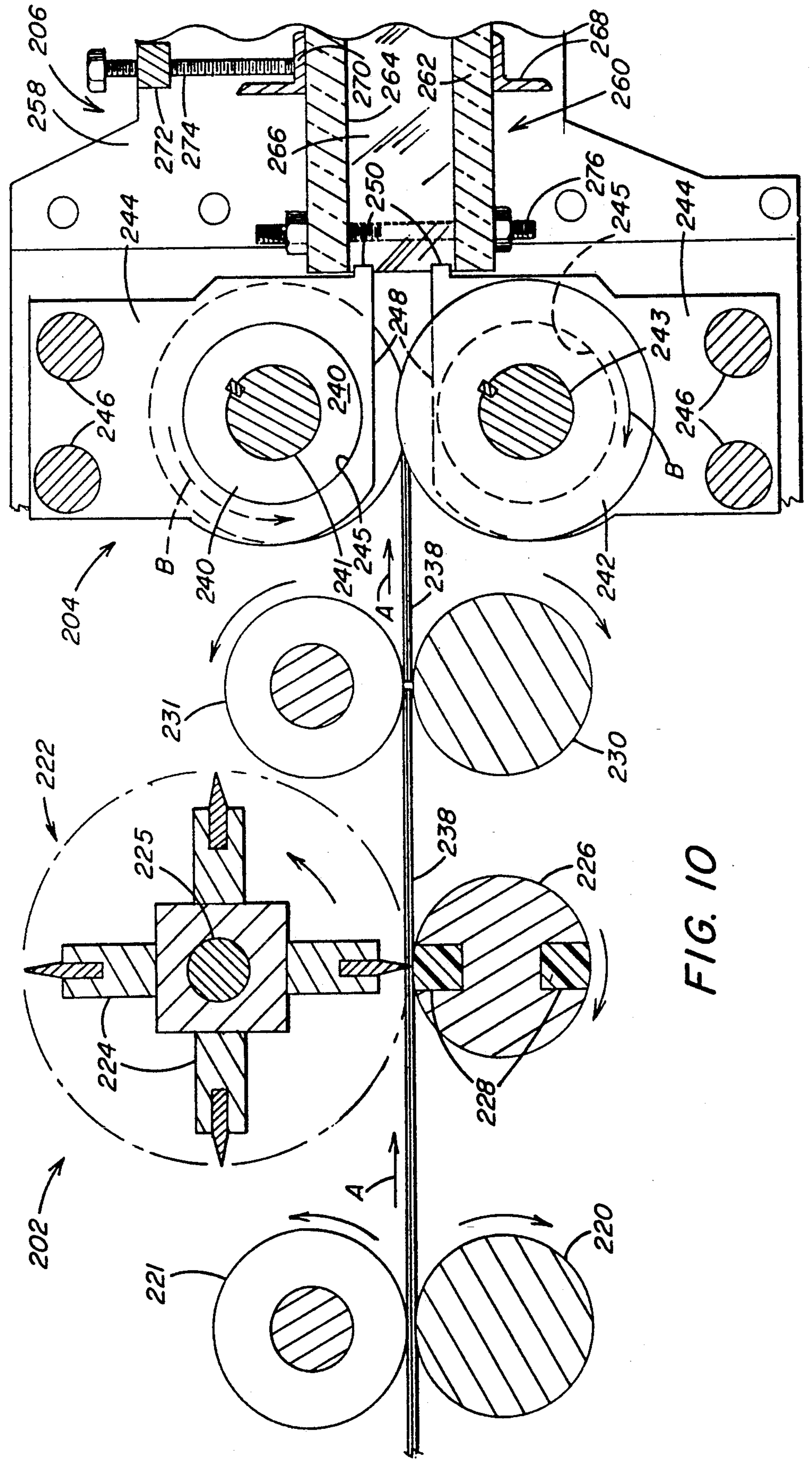
FIG. 10 is a fragmentary, sectional view of the embodiment of FIG. 9.

As seen schematically in FIG. 10, strips 20 are urged outwardly from exit opening 42 and area impelled against barrier 60. Barrier 60 causes strips 20 to be retained within confined area 62' adjacent to barrier 60. Strips 20 may temporarily rest upon lower wall 112'.

The preferred method of producing crimped strips 22 comprises the following steps: (a) passing shredded sheet material 34 in strip form into confined area 62; (b) controllably preventing the exit of the strips of sheet material 34 from confined area 62; and (c) passing additional strips of sheet material 34 against a portion of the previously confined strips of sheet material 34 to cause such strips of sheet material 34 to fold against itself and thereby become folded and crimped into a generally accordion-shaped strip.

An additional step may comprise the step of cutting crimped strips 22 into various segments.

As seen in FIGS. 10 throug 13, another preferred embodiment of the invention is provided in the form of a machine 200 for forming the preferred packing product. The preferred machine 200 includes a feeding section 202, a cutting section 204 and a discharge section 206. The feeding section 202 is provided to feed one or more sheets of material to the cutting section 204 to be longitudinally cut thereby. The strip means cut by the cutting section 204 are then discharged from the cutting section 204 to the discharge section 206.

To provide basic power to the machine 200, a feeding motor 208 is included in the feeding section 202. The feeding motor 208 has an associated reduction gear section 210 with a reduction gear output in the form of a drive sprocket 212. For powering the cutting section 204, a cutting motor 214 is provided with an associated reduction gear section 216. The output of the reduction gear section 216 is in the form of a drive sprocket 218.

Figure 9:
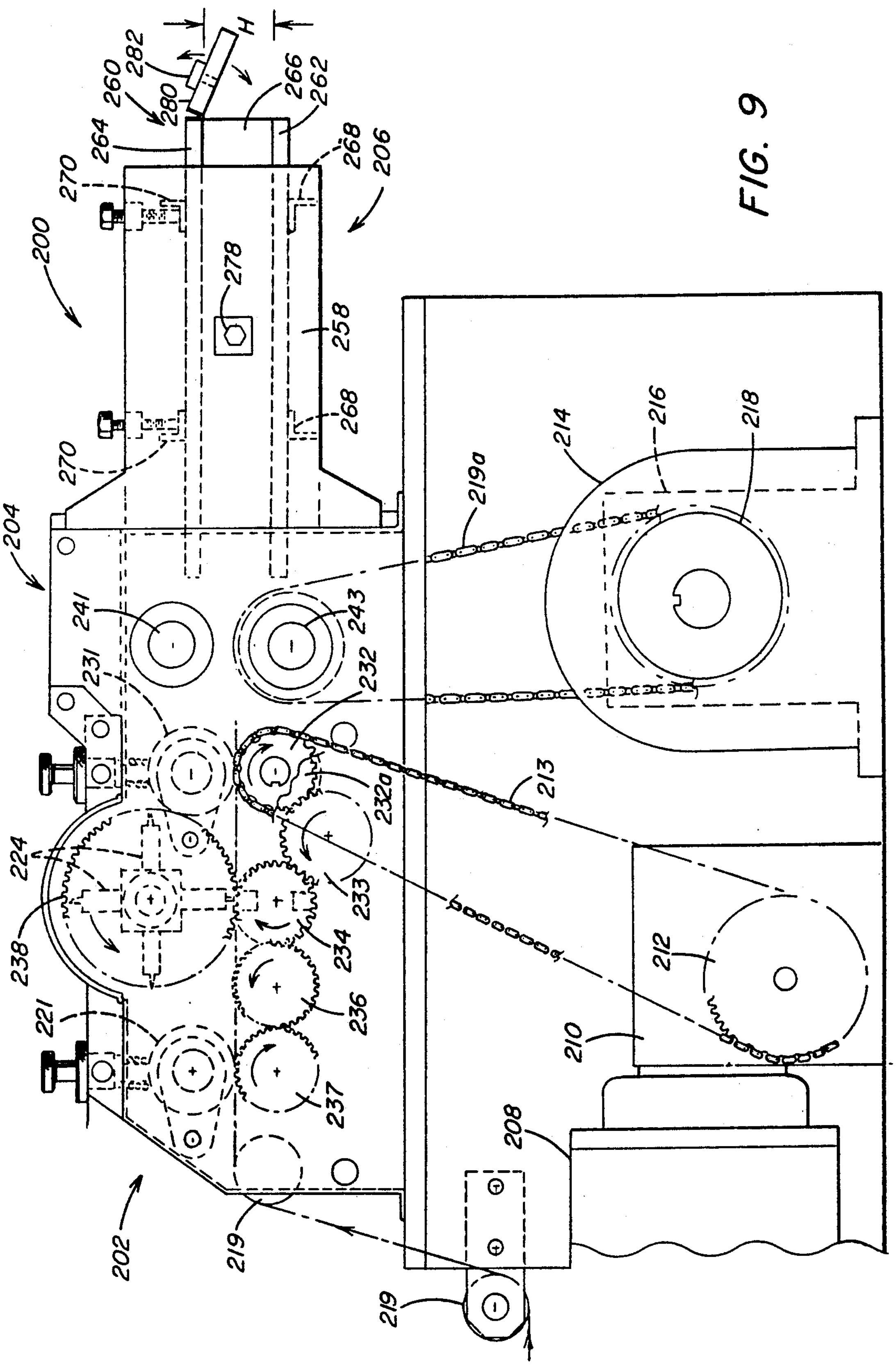
FIG. 9 is a side elevational view of another preferred embodiment including various features of the present invention.

To initiate the operation of the machine 200, a base material for forming the preferred packing material is preferably supplied in roll form (not shown) to provide one or more layers of the material to the feeding section 202. As seen in FIG. 9, the material is initially directed for alignment through redirecting rollers 219. Although not specifically duplicated in FIG. 9, three layers of the material are preferred.

As seen in FIG. 10, the feeding section 202 is configured for advancing the material in a first direction A. However, the preferred machine 200 is different from the embodiment shown in FIGS. 1 and 2. It has been determined, for machine 200, that it is advantageous to provide pre-cut sheets of the material rather than transversely cutting the packing material after it is formed. Accordingly, a first drive roller 220 feeds the material to a transverse cutting component 222. The transverse cutting component 222 includes four rotating cutting blades 224 which are mounted for rotation on a shaft 225. A back-up cylinder 226 is in alignment with the shaft 225 and includes neoprene sections 228 for specific alignment and cooperation with the blades 224.

Although not shown in the Figures, each of the blades 224 includes a generally serrated edge but also includes several gaps along the lengths thereof in order to provide only a partial cut of the material as it is transferred thereunder. With the material being only partially cut, it is advanced to a second drive roller 230 for further direction to the cutting section 204. To maintain the material in position for advancement to the transfer cutting component 222, a first biased roller means 221 is biased toward and in alignment with the first drive roller 220. A second biased roller means 231 is biased toward and in alignment with the second drive roller 230.

The first drive roller 220, the backing cylinder 226 and the second drive roller 230 all rotate at the same rotational speed. Each of the components in the feeding section 202 are preferably greater than 15 inches wide in order to provide the material to the cutting section 204 which, as will be seen, is also capable of accommodating material 15 inches wide. The first drive roller 220 is preferably knurled or rough to provide sufficient friction for advancing the material therethrough while the second drive roller 230 is preferably smooth. Additionally, the second drive roller 230 has a slightly larger diameter than the first drive roller 220 in order to keep the material tight for proper partial cutting by the transverse cutting component 222. Because of the smooth surface for roller 230, the additional tension created by the slightly larger second drive roller 230 is not sufficient to actually tear or separate the resulting sheets 238 of material simply by the action of the drive rollers 220, 230.

The means for providing the rotation of the first drive roller 220, the cutting blade shaft 225, the backing cylinder 226, and the second drive roller 230 is shown in FIG. 9. With the basic power being provided by the feeding motor 208, the second drive roller 230 includes a driven sprocket 232 rigidly mounted on the end thereof for driving connection with a chain drive 213 from the drive sprocket 212. A gear 232*a* on the shaft of the second drive roller 230 is in engagement with and rotates a first idler gear 233 mounted on the side housing of the feeding section 202. The first idler gear 233 is in turn in engagement with a gear 234 associated with the backing cylinder 226. The gear 234 is in engagement with a second idler gear 236 and with a larger gear 238 connected to the rotating shaft 225 of the cutting blades 224. The gear 238 has a diameter which is twice that of the gear 234 in order to produce rotation of the shaft 225 at one half of the speed of the backing cylinder 226. Consequently, the four cutting blades 224 are brought into alignment with the two neoprene sections 228 of the backing cylinder 226 as they rotate at correspondingly different speeds. The second idler gear 236 is in engagement with and rotates the drive gear 237 on the end of the first drive roller 220. With the directional rotation of each sprocket and gear as indicated by the small arrows in FIGS. 9 and 10, it can be seen that the roll of material will be fed towards the cutting section 204 by the feeding section 202.

In the preferred machine 200, the feeding motor 208 is a variable speed, five horsepower motor with the reduction gear section 210 having a reduction gear ratio of ten to one. The motor 208 is preferably set to produce a feeding of the material having a width of between 8 inches to about 15 inches at a speed of about 360 feet per minute. The spacing of the cutting blades 224 around the shaft 225 is such that the partial cut is produced every 4.4 inches along the length of the material. Accordingly, the preferred sheets 238 to be fed to the cutting section are 15 inches wide and 4.4 inches long.

The cutting section 204, as best seen in FIGS. 9, 10, 11 and 12, includes an upper and lower set of overlapping cutting discs 240, 242. The upper cutting discs 240 are fixedly mounted for rotation on a shaft 241 while the lower cutting discs 242 are fixedly mounted for rotation on a shaft 243. The lower shaft 243 includes a driven sprocket (not shown) and is connected by a chain 219*a* to the drive sprocket 218 of the cutting motor 214. The shafts 241, 243 are coupled by matching gears (not shown) for corresponding rotation in the opposite direction as generally indicated by the arrows B. The overlapping and interengagement of the discs 240, 242 are such that adjacent cutting discs 240, 242 on their respective shafts 241, 243 are separated one from the other for receipt of a cutting disc 242, 240 on the other shaft 243, 241 therebetween. The array of overlapping cutting discs 240, 242 are capable of receiving therebetween each sheet 238 of the material, whether there is one or more layers, from the feeding section 202. Once directed between the cutting discs 240, 242, the sheets 238 are longitudinally cut, in the direction A, into strip means with each strip means including a corresponding number of layers as the original sheets 238 supplied by the feeding section 202.

The sheets 238 are generally cut to form elongated strip means associated with each cutting disc 240, 242. The cuts are produced between the side edges of each cutting disc 240 and the adjacent side edges of the adjacent cutting disc 242. The strip means produced by the cutting discs 240, 242 are generally maintained in alignment for passage through the cutting section 204 by an array of combers 244 associated with each set of cutting discs 240, 242.

Each comber 244 includes a central opening 245 for receipt of the corresponding shaft 241, 243 therethrough. The combers on one shaft 241, 243 are laterally or transversely aligned with corresponding cutting discs 242, 240 on the other shaft 243, 241. Each comber 244 is mounted on and supported by transverse bars 246 extending across the cutting section 204 through corresponding holes in the end of the comber 244. Despite the support by the rods 246, the preferred combers 244 are capable of limited movement along the shafts 241, 243 in the same manner as the cutting discs 240, 242.

Most significantly, each of the combers 244 includes an end face 248 in alignment with the corresponding cutting disc 240, 242 on the opposite shaft 241, 243. The configuration of cutting discs 240, 242 and aligned end faces 248 of the combers 244 produces a general region for restricted movement of the strip means formed by the cutting section 204 as the sheets 238 pass therethrough. The aligned end face 248 terminates at an extension 250 of each comber 244 at the discharge side of the cutting section 204. The purpose of the extensions 250 will be discussed hereinbelow.

The cutting section 204 is powered by the motor 214 which is preferably fifteen horsepower with variable speed control and includes the reduction gear 216 with a six to one reduction ratio. Each of the cutting discs 240, 242 is about $\frac{1}{8}$ of an inch wide. Accordingly, each cutting shaft 241, 243 includes at least sixty cutting discs 240, 242 thereon to provide a total of at least one hundred and twenty cutting discs 240, 242 for the two sets to produce the desired cutting of the sheets which are 15 inches wide. Preferably, the speed of the motor 214 is adjusted to provide a speed at the outer cylindrical surface of each cutting disc 240, 242 of about 380 feet per minute. In other words, the cutting discs 240, 242 are rotating at a linear speed faster than the second drive roller 230. As a result, the faster speed of the cutting discs 240, 242 causes them to grab the sheets 238 as they enter therebetween and causes each sheet to be pulled from its following adjacent sheet 238 to separate the partially cut sheets for advancement through the cutting section 204. As seen in FIG. 10, the separation has not yet occurred and tends to occur as the sheet 238 is leaving the second drive roller 230. It is desirable for the drive roller 230 to maintain contact with the following adjacent sheet 238 in order to maintain the tension on the material for transverse cutting. Consequently, each sheet 238, whether having a single or multiple layer of material, will be longitudinally cut in the cutting section 204 prior to the entrance of the next available sheet 238 into the cutting section 204.

It should be clear, from the discussion of the embodiment of FIGS. 1 and 2, that the preferred machine 200 must also include some means for restricting the movement of the strip means after their formation in the cutting section 204. Accordingly, the discharge section 206 is aligned with the cutting section 204 and primarily includes a discharge chute 260. The discharge chute 260 is maintained in position by framing 258 which is secured at opposite sides of the cutting section 204. The preferred discharge chute 260 is primarily formed of plexiglass or some other durable clear plastic material such as that described for the embodiment of FIGS. 1 and 2.

The discharge chute 260 includes a lower wall 262 and an upper wall 264 with two side walls 266 therebetween. To generally support the discharge chute 260, a pair of lower brackets 268 are secured to the framing 258 to receive and support the lower wall 262 thereon. The leading end of each side wall 266 is movably secured between the lower wall 262 and the upper wall 264 by bolt means 276. To apply pressure to the lower wall 262 and the upper wall 264 for complete retention of the side walls 266 therebetween, there is provided adjustable bracketing at the top of the framing 258 for creating a downward force on the upper wall 264. Specifically, brackets 270 extend across the top surface of the upper wall 264 and are maintained in place by adjustable bolt means 274 which extend through a rigid bar 272 secured between the side framing 258. Basically, the bolt means 274 are intended, through the brackets 270, to apply reinforcing pressure to the upper wall 264 and the lower wall 262 while also providing significant frictional force on the upper and lower surfaces of the side walls 266.

Figure 11:
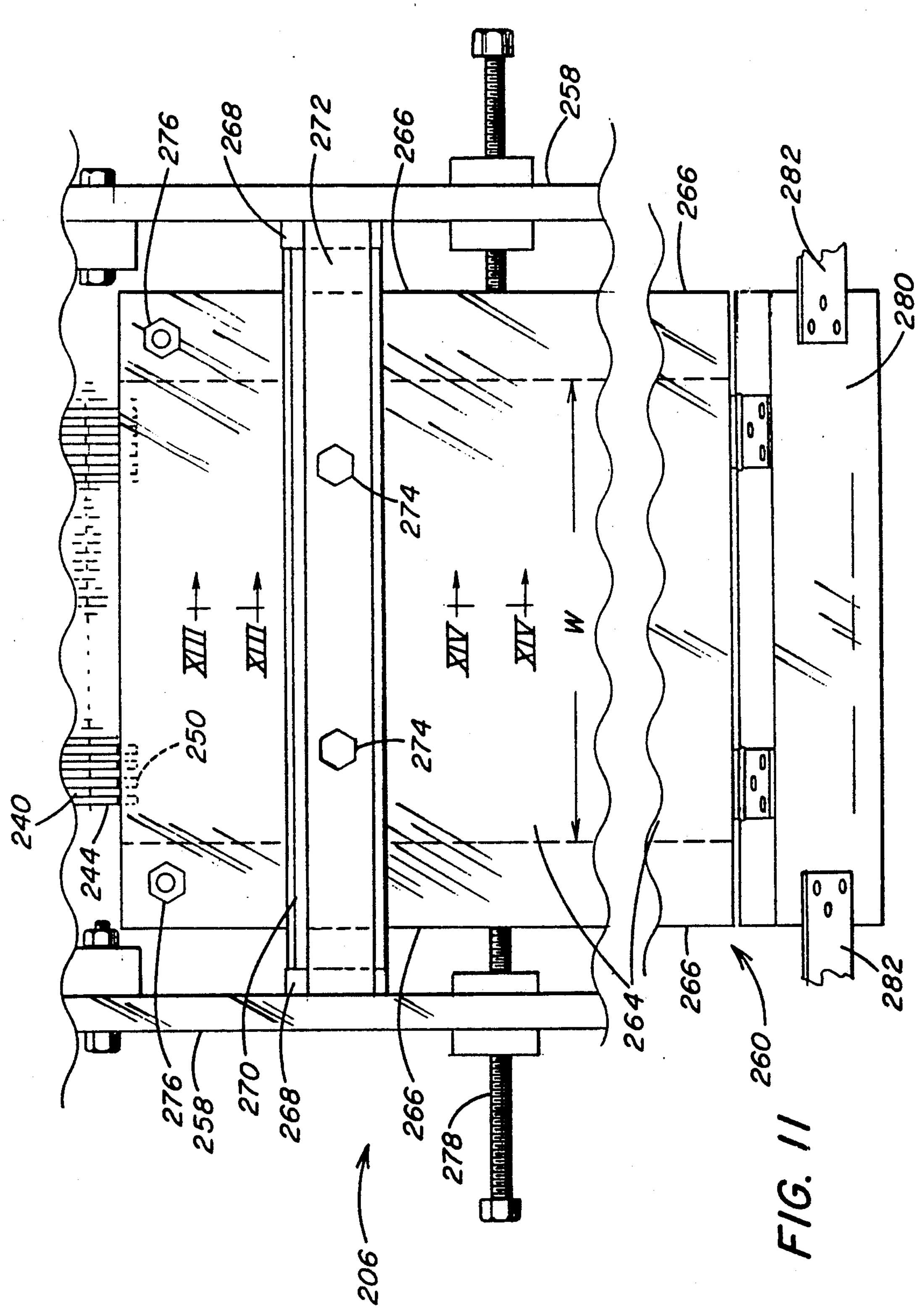
FIG. 11 is a fragmentary, top view of the discharge section of the preferred embodiment of FIGS. 9 and 10.

This means of applying pressure to the side walls 266 is significant when it is understood that the preferred discharge chute 260 can be adjusted to accommodate sheets of material having different widths as the strip means formed thereby are discharged from the cutting section 204. In other words, the discharge section 206, as shown in FIG. 11, is intended to receive the strip means formed from sheets of material which are about 15 inches wide. However, the feeding section 202 and the cutting section 204 could reasonably accommodate sheets of material as narrow as 8 inches. However, to provide for proper discharge through the discharge section 206, the preferred chute 260 must be adjusted for producing sufficient resistance to the strip means discharged from the cutting section 204. To provide for increased resistance in the discharged section 206, the mounting of the side walls 266 by the bolt means 276 allows the trailing end of each side wall 266 to be rotated to cause the discharge chute 260 to have a narrowing profile. Specifically, if the side walls 266 are to be configured with a narrower profile for the fabrication of strip means from narrower sheets of material, the bolts 274 can be loosened to reduce the pressure between the brackets 268, 270. With the force reduced on the upper wall 264 and the lower wall 262, each side wall 266 can be rotated about its respective bolt means 276. To provide proper adjustment to the side walls 266, each frame 258 is provided with adjustable bolt means 278 for controlled positioning of the side walls 266 about the bolt means 276. Although the side walls 266 are shown to be parallel in FIG. 11, for the accommodation of sheets of material which are about 15 inches wide, if the sheets of material were as narrow as 8 inches, the bolts 278 could be inwardly adjusted to cause the trailing end of the discharge chute 260 to be significantly narrowed to about 8 inches. The resulting narrowing profile can create a reduced volume for the collecting of strip means therein and for providing significant restrictions on all of the strip means being discharged therethrough.

Further restriction to the passage of strip means through the discharge chute 260 can be provided by the adjustable gate 280 at the output end thereof. The gate 280 is hingedly coupled to the upper wall 264. Bracketing 286 at the opposite ends of the gate 280 can be used for manual or automatic control means (not shown) for the proper positioning of the gate 280. As mentioned for the embodiment shown in FIGS. 1 and 2, the gate 280, during continued production of the packing product of the present invention, need not always be in a closed and restricting position. In other words, once the gate 280 is closed to produce sufficient collecting of the packing product within the interior of the discharge chute 260, the general friction created by the packing product through the discharge chute 260 may be sufficient to cause adequate restrictions at the discharge of the cutting section 204 to produce the desired characteristics to the strip means as described hereinbelow.

The preferred chute means 260 has an internal height H of about 2 inches and internal width W which can be varied between 8 and 15 inches. Because of the significant pressure and forces which are generated within the discharge chute 260, the lower wall 262 and the upper wall 264 have a thickness of about $\frac{3}{4}$ of an inch while each of the side walls 266 have a thickness of about $1\frac{1}{2}$ inches. While the preferred length of the discharge chute is about 12 inches, the length could be altered depending on the type of material being employed to produce the preferred packing product. The height of 2 inches allows the extensions 250 of each comber 244 to be loosely positioned within the interior of the chute 260 to produce a better transition from the cutting section 204 to the discharge section 206.

As shown in FIGS. 9, 10 and 11, the preferred embodiment, in the form of machine 200, does not include any representation of the packing product being formed thereby. However, the enlarged fragmentary view of FIG. 12 includes a representation of what is felt to occur within the interior of the cutting section 204. It should be understood that the preferred machine 200 produces an extremely packed and tight array of strip means which basically comprise the preferred packing product prior to expansion, relaxation and intermixing in the discharge chute 260 and after leaving the discharge chute 260. The plurality of tightly mixed and interconnected strip means produces the packing product in such a compacted form that actual identification of the orientation and configuration of the various strip means within the cutting section 204 and discharge section 206 is quite difficult. However, the best understood representation of the packing product, as it is being formed in the machine 200, is provided in a schematic form in FIGS. 12, 13 and 14.

Generally, it should be recognized that all of the base material for the formation of the preferred packing product includes a natural resilience with a tendency to resist folding. Whether the material is paper, cardboard, mylar or any other material in sheet form, the material includes a tendency to remain in a straightened form and to resist any folds or bends thereof. This principle can be readily observed by simply taking a small sheet of paper and trying to fold it in half. If one attempts to apply pressure to the fold to impart a folded memory to the sheet material, it is not uncommon for the fold to "relax" as the two halves of the paper tend to naturally separate because of the original "memory" in the paper tending to resist the fold. The same principle can also be observed if several layers are also folded at the same time.

Throughout the remainder of the description provided hereinbelow, it should be noted that each of the folds produced in the preferred strip means are, at least initially, quite tight so that the adjacent longitudinal portions of the strip means tend to lie in close contact. However, as will be seen, as pressure on each of the strip means is relaxed, the folds will have a natural tendency to expand or relax to cause the portions adjacent to folds to angularly separate.

As seen in FIG. 12, the sheets 238, as they advance between the cutting wheels 240, 242, are initially cut at the side edges thereof to form initial strip means 300*a* which tend to lie along the smooth, outer cylindrical surface 240*c*, 242*c* of the respective cutting wheels 240, 242. The initial strip means 300*a* is constantly being advanced, at least partially, by the rotating surface 240*c*, 242*c* toward the discharge side of the cutting section 204.

However, as with the embodiment shown in FIGS. 1 and 2, significant resistance to each of the initially formed strip means 300*a* is provided by a collection of previous formed strip means in the discharge section 206 which will be discussed hereinbelow. It is sufficient initially to understand that a plurality of previously formed strip means are tightly collected at the discharge side of the cutting section 204. Consequently, as each initially formed strip means 300*a* is advanced through the cutting section 204 by each of the cutting discs 240, 242 applying frictional force thereto, the resistance at the end thereof causes the initially formed strip means 300*a* to be sequentially folded to provide a longitudinally compressed strip means 300*b*. The longitudinally compressed strip means 300*b* is formed inherently within the cutting section 204 by previously formed and fully longitudinally compressed strip means 300*b* collecting at the discharge side thereof. It is impossible to stop the machine 200 to see the exact location of the fully longitudinally compressed strip means between the cutting discs 240, 242 and the combers 244. However, it is expected that they will tend to collect to the discharge side of a connecting line between the centers of the shafts 241, 243. As a result, it is possible that the initially formed strip means 300*a* will be relatively shorter than shown in FIG. 12. The sequential folding of each strip means may begin as each strip means is being longitudinally cut. However, with all the cutting discs 240, 242 rotating toward the discharge side, it would appear that the frictional force created on each fully longitudinally compressed strip means 300*b* would tend to cause them to collect toward the discharge end of the cutting section 204 rather than toward the connecting line of the cutting section 204.

The moving collection of fully longitudinally compressed strip means 300*b* is maintained in position for discharge by the aligned end faces 248 of each of the combers 244 and the extensions 250. As indicated above, the view shown in FIG. 12 represents the best understanding of the type of collection of the fully longitudinally compressed strip means 300*b* within the cutting section 204 at the discharge side thereof. While the outer cylindrical surface 240*c*, 242*c* does impart some compressive force on each of the initial strip means 300*a* as the fully longitudinally compressed strip means 300*b* are being formed, it should also be understood that the side surfaces 240*s* and 242*s* of each cutting wheel 240, 242 also apply side frictional forces to each of the fully longitudinally compressed strip means 300*b* during and after its formation.

It should be noted that the preferred machine 200 differs from the embodiment shown in FIGS. 1 and 2 by the inclusion of the smooth cylindrical outer surfaces 240*c* and 242*c* of the cutting discs 240 and 242. The cutting discs of the embodiment shown in FIGS. 1 and 2 preferably included a serrated or tooth configuration which could grip material provided thereto and could tend to insure proper longitudinal cutting of the material for the formation of strip means. However, it has been found that one feature of the invention is improved by the inclusion of the smooth outer cylindrical surfaces 240*c*, 242*c* because of the type of longitudinal compacting of the various strip means which occurs within the cutting section 204 of the machine 200. The smooth outer cylindrical surfaces 240*c*, 242*c* do not tend to tear the material and significantly reduce the possibility of dust and other fine particles being produced. Further, as seen in FIG. 12, with the tight collection of the fully longitudinally compressed strip means 300*b* at the outlet side of the cutting discs 240, 242, the smooth edges of the outer surface of the cutting discs can freely rotate by the previously collected fully longitudinally compressed strip means 300*b* without any side ripping or tearing thereof.

It should now be clear that the general force provided, by the rotation of the cutting discs 240, 242, to create the fully longitudinally compressed strip means 300*b* also continues to impart force to each previously formed strip means to cause migration and movement in a direction toward the discharge section 206. Depending on the thickness of the material and the number of folds produced, it would not be uncommon for the fully longitudinally compressed strip means 300*b*, formed of 4.4 inch strip means, to be only about ½ inch to about 1 inch long in the cutting sections 204.

As seen in FIG. 13, the strip means, according to the best observation possible, appear to collect in some type of wave form near the entrance end of the discharge chute 260 as tightly longitudinally compressed strip means 300*c* advance through the discharge chute 260. While the tightly longitudinally compressed strip means 300*c* have very tight folds therein, it is not expected that their folds will be quite as tight as those of the fully longitudinally compressed strip means 300*b* as initially formed within the cutting section 204. Clearly, the resistance produced in the discharge chute 260 tending to cause the sequential folding of each of the initial strip means 300*a* will be greater within the cutting section 204 than at subsequent positions along the discharge chute 260. The restricting force is greater at the discharge side of the cutting section 206 than at further locations along the discharge chute 260 because of the added effects of the frictional resistance of the various strip means as they tend to slide along the internal surface of the discharge chute 260. Accordingly, FIG. 13 is only a schematic representation of what appears to be occurring at the inlet end of the discharge chute 260 and the waves are probably not as uniform or as uniform or as evenly positioned. However, the strip means 300*c* should still be quite tightly longitudinally compressed but not to the same extent as the fully longitudinally compressed strip means 300*b*. This tendency to be less longitudinally compressed is fully consistent with the resilient nature of the material used to form the strip means which comprises the basic packing product.

As seen in FIG. 14, at a location within the discharge chute 260 which is more remote from the cutting section 204, there is included a mixed array of less longitudinally compressed strip means 300*d*. As the pressure on the less longitudinally compressed strip means 300*d* tends to reduce, because of the opening at the discharge end of the discharge chute 260, the natural resilience of each strip means tends to cause them to expand and to be relatively repositioned within the discharge chute 260. There is a significant volumetric expansion of the strip means 300*d* with clear intermixing and repositioning of all of the less longitudinally compressed strip means 300*d* as they are approaching the end of the discharge chute 260.

With the description provided for FIGS. 12, 13 and 14, it should be clear that the basic force required to form the longitudinally compressed strip means is produced by the rotating cutting discs 240, 242 against the resistance of the previously formed longitudinally compressed strip means tending to collect throughout the length of the discharge chute 260. The natural resilience of each longitudinally compressed strip means causes them to generally longitudinally expand as they proceed toward the end of the discharge chute 260 and, once released from the discharge chute 260 into a container (not shown), further expansion of each strip means will occur. Consequently, it should now be clear that the preferred machine 200 does not include simply a shredding machine configuration for forming a collection of strip means which is compressed to form a packing product. Instead, the preferred packing product is composed of a plurality of individually longitudinally compressed strip means which tend to expand in an interlocking and resilient manner to provide the resulting packing product with individual strip means having natural resilience, a tendency to longitudinally expand, and a tendency to resist lateral or side forces.

Figure 15:
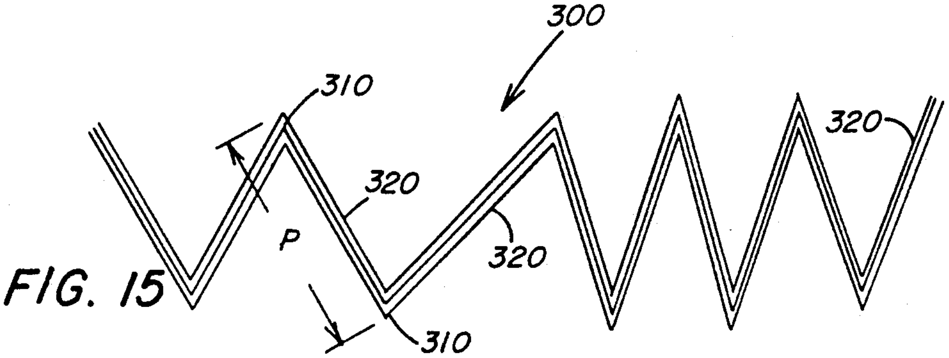
FIG. 15 is a fragmentary, side view of a generally compressed preferred strip of material including various features of the invention which can, for example be made by the embodiment of FIGS. 9, 10 and 11.

As seen in FIG. 15, a fragmentary section of a typically longitudinally compressed strip means 300 would include a plurality of folds 310 with generally planar longitudinal sections 320 therebetween. The folds extend substantially transverse to the longitudinal direction of the strip means. One planar section 320 extends in a second direction, generally transverse to the longitudinal direction, to terminate at a fold 310. The next planar section 320 extends away from the fold 310 in a third direction which is also transverse to the longitudinal direction and is substantially opposite the second direction of the previous planar section 320.

It has been found that, with proper resistance established in the discharge chute 260, a majority of planar sections or portions will have a length P of about ⅛ of an inch to about ¼ of an inch for the longitudinally compressed strip means 300 formed in the preferred machine 200 having cutting discs 240, 242 with a width of ⅛ of an inch. In other machines similar to the preferred machine 200, in which cutting discs having a width of about ¼ of an inch, it is not uncommon for the majority of the planar sections 320 to have a length of about ¼ inch to ½ inch. In any case, with at least fifty percent of the longitudinally compressed strip means being formed as generally seen in FIG. 15, the preferred packing product includes an overall, combined resilience as desirable. The longitudinally compressed strip means 300, formed of 4.4 inch strip means, would typically be only about 1½ inch to about 2½ inches long.

Figure 16:
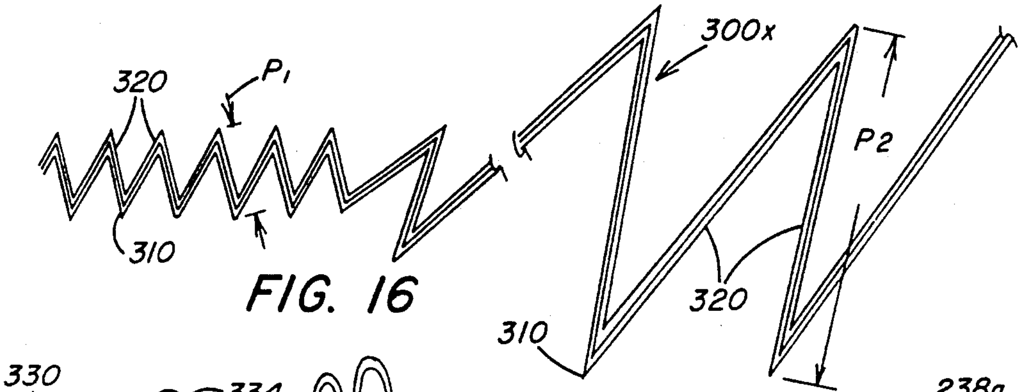
FIG. 16 is a fragmentary, side view of a generally compressed acceptable strip of material including various features of the invention which, for example, can also be made by the embodiment of FIGS. 9, 10 and 11.

As mentioned above, the general configurations shown in FIGS. 12, 13 and 14 are rather schematic and idealized. Because of the tight compaction of the various strip means formed therein, clearly all of the strip means do not have the preferred, generally even folding as shown in FIG. 15. For example, as seen in FIG. 16, it is not uncommon for some of the longitudinally compressed strip means 300*x* to have a varying configuration of folds and generally longitudinal planar sections therebetween. As can be best determined, a significant number of such longitudinally compressed strip means 300*x* may be formed because of individual gaps which may occur near the cutting discs 240, 242 as the previously formed fully longitudinally compressed strip means 300*b* are being formed and shifted toward the discharge of the cutting section 204. The longitudinally compressed strip means 300*x* may have smaller longitudinal planar sections with a length P1 which are as small as 1/64 of an inch and larger longitudinal planar sections with a length P2 as large as an inch.

In any case, while the various longitudinally compressed strip means 300, 300*x* have natural resilience and are generally biased along the length thereof, it should also be noted that the resistance created by the folds 310 tend to provide significant lateral or side strength to each strip 300, 300*x* as they are intermixed and interconnected throughout the preferred packing product. Further, as the longitudinally compressed strip means 300, 300*x* tend to expand the initially formed folds having a zero angle between the longitudinal planar sections 320, the partially relaxed angles of the folds could typically vary from as small an angle as 5 or 10 degrees to larger angles of about 90 degrees. A very low percentage of individual folds may be completely straightened to about 180 degrees as the various longitudinally compressed strip means 300, 300*x* bend, curve, and intermix together to form the interlocking array of the desired packing product. In fact, the intermixing and interconnection of all of the various strip means of the preferred packing product are so complicated and intertwined that representation in a drawing is virtually impossible. In any case, from the description provided hereinabove, it should be clear that the primary features provided to the preferred packing product, similar to that shown in schematic form in FIGS. 6 and 8 are produced by the individual characteristics of each of the longitudinally compressed strip means of which the preferred packing product is composed.

As shown in FIGS. 15 and 16, the strip means 300, 300*x* are preferably formed of the three layers of the sheet material as initially provided by the feeding section 202. The layers are shown separated for emphasis but would normally be in close contact throughout the length. Again, not only is side resilience and strength provided by each of the folds 310, but additional side resistance and strength is provided by the inclusion of the multilayers of the material in each of the longitudinal sections or portions 320.

Figure 17B:
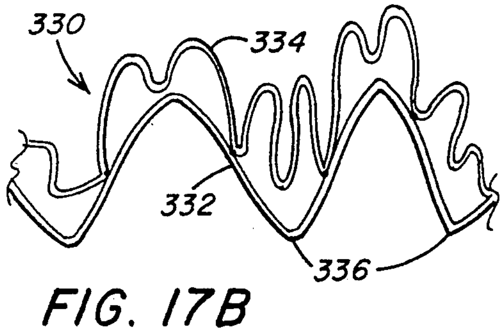
FIG. 17B is a fragmentary, side view of a generally compressed strip of the invention formed of the material of FIG. 17A.
Figure 17A:
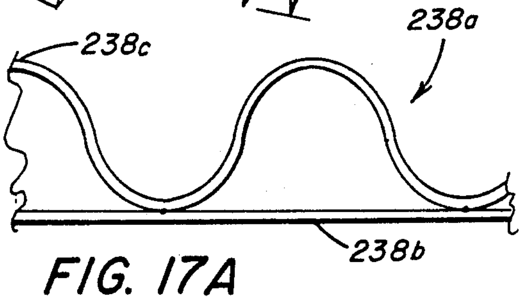
FIG. 17A is a fragmentary, side view of a single-faced or one-sided corrugated cardboard material in sheet form or being supplied, for example, to the feeding section of the embodiment of FIGS. 9, 10 and 11.

As seen in FIG. 17A, the preferred machine 200 can also be utilized to provide a significantly sturdier packing product by the introduction of one-sided corrugated cardboard 238*a* thereto. The corrugated cardboard 238*a* has a planar side 238*b* to which is joined at transverse portions therealong the corrugated side 238*c* which is also formed of cardboard material. The feeding of the one-sided corrugated cardboard 238*a* to the cutting section again produces strip means which are longitudinally compressed but with a generally less uniform configuration than seen in the strip means 300, 300*x* of FIGS. 15 and 16. The planar portion 238*b*, as seen in FIG. 17B, is converted to have a plurality of folds 336 generally separated by planar sections 338. The corrugated side 238*c* is converted to have multiple sections and folds 334 depending on the resistance created as the strip means are generally discharged from the cutting discs 240, 242. In any case, the resulting product shown in FIG. 17B is longitudinally compressed while providing even greater side or lateral strength and resistance to collapsing to provide overall rigidity and resilience to the packing product formed thereby.

Figure 18:
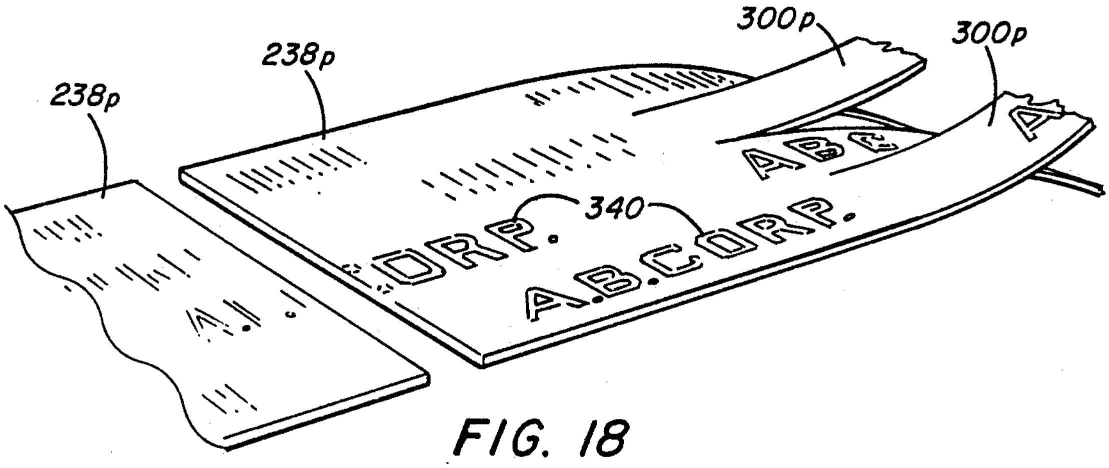
FIG. 18 is a fragmentary, isometric view of a narrow section of the sheet material including another feature of the invention to be made, for example, by the embodiment of FIGS. 9, 10 and 11.

As seen in FIG. 18, a small, approximately ½ inch wide portion of another preferred sheet 238*p* is shown. While the entire sheet 238*p* may again have a width of about 15 inches, the smaller section is shown in FIG. 18 for demonstration purposes. With proper printing or embossing or the like on the sheet 238*p*, a company name, logo, or trademark may be provided at 340 which will, with proper alignment, be present when the various strips 300*p* are initially formed to produce the desired packing product. While the initially formed strip means 300*p* are only ⅛ of an inch wide, the overall machine 200 allows the printing to be provided in a simplified manner before the strip means are formed which would not normally be expected for such small strip means of the packing product.

From the description provided, it should be clear that the present invention includes a method of producing a packing product includes the steps of: providing a plurality of narrow, elongated strip means of material, each of which has a small width dimension and a substantially larger length dimension; advancing each strip means of the material in a first direction generally parallel with the length dimension of each strip means; and sequentially folding each strip means of the material generally on itself during the advancing. The sequential folding is for causing adjacent longitudinal portions of each strip means of the material at each side of the folding top respectively extend in a second direction and in a generally opposite third direction, which second and third and in a generally opposite third direction, which second and third directions are substantially transverse to the first direction. The sequential folding causes each of the adjacent longitudinal portions to be generally planar. The sequential folding produces a plurality of folds which are respectively between each of the adjacent longitudinal portions and the folding of the material at each of the folds produces tension in the material. The sequential folding is produced by restricting each strip means of material after the advancing in the first direction. The restricting can be provided by collecting the strip means of material downstream of the advancing and the sequential folding.

Preferably, the collecting of the strip means is between generally parallel wall means which extend in the first direction and are disposed at opposite sides of a region of the advancing and the sequential folding. The collecting of the strip means of material produces at least some friction on the wall means in opposition to the advancing.

Each strip means can include a plurality of layers of the material and the advancing and the sequential folding of each strip means can occur simultaneously for each layer of the material in the strip means.

The advancing of each strip means can include simultaneous advancing of the plurality of strip means with each strip means being in a side edge-by-side edge relationship with adjacent strip means. The providing of the plurality of strip means can include: feeding at least one sheet of material in the first direction; cutting the at least one sheet of material into the plurality of strip means; the cutting being performed by rotating two sets of alternating overlapping cutting discs; the feed of the at least one sheet of the material being between the two sets of cutting discs; and the advancing of each strip means is provided at least partially by the rotating of a cutting surface of a corresponding one to the cutting discs cutting each strip means as the cutting surface moves in the first direction. The providing of the plurality of strip means can further include printing information on at least one side of the sheet of material prior to the feeding of the sheet of material. The feeding can include a plurality of sheets of the material for forming each strip means to include a plurality of layers and the sequential folding of the plurality of layers of each strip means occurs simultaneously. The plurality of layers of each strip means can include aligned folds and substantially aligned adjacent longitudinal portions respectively at each side of the aligned folds. The sequential folding of each strip means can initially occur adjacent the cutting surface of a corresponding one to the cutting discs. The sequential folding can occur adjmacent a discharge of the two sets of the cutting discs. The feeding of the plurality of sheets can include the sheets having at least two different colors for producing the packing product to include the strip means with at least two different colors.

The present invention also includes apparatus for producing a packing product including means for advancing each strip means of a plurality of strip means of material in a first direction, each strip means of the material having a small width dimension and a substantially longer length dimension which length dimension extends in the first direction; and means for sequentially folding each strip means of material generally on itself downstream of the means for advancing. Each strip means cna include a plurality of layers of the material, the means for advancing can simultaneously advance the layers of each strip means, and the means for sequentially folding each strip means can include simultaneously correspondingly folding each of the layers of each strip means. The means for sequentially folding causes adjacent longitudinal portions of each strip means of the material to respectively extend in a second direction and a generally opposite third direction, and the second direction and the third direction are substantially transverse to the first direction. Each of the adjacent longitudinal portions is substantially planar. The means for sequentially folding produces a plurality of folds which are respectively between each of the adjacent longitudinal portions and the folds produce tension on the material at each of the folds. The means for sequentially folding can include means for restricting each strip means of the material downstream of the means for advancing in the first direction.

Preferably, the means for restricting each strip means of the material can include collecting each strip means of material between generally parallel wall means which extend in the first direction and are disposed at opposite sides of a region downstream of the means for advancing each of the strip means. The means for collecting the strip means of material produces at least some friction on the wall means in opposition to the means for advancing the plurality of strip means of material.

The means for advancing the plurality of strip means can include means for simultaneously advancing the strip means of the plurality with each strip means being in a side edge-by-side edge relationship with adjacent strip means of the plurality. The apparatus can also include means for cutting at least one sheet of the material for simultaneously providing the plurality of strip means of the material. The at least one sheet of material can include printed information on at least one side thereof prior to being advanced to the means for cutting. In the apparatus, the means for cutting includes two sets of alternating, overlapping cutting discs; the two sets of cutting discs respectively rotating in opposite directions; and each of the cutting discs providing the means for advancing a corresponding strip means which corresponding strip means is produced by the cutting of the cutting disc. The means for cutting includes a plurality of the sheets of material for cutting each strip means to include a plurality of layers and the means for sequentially folding producing simultaneous folding of each layer of each strip means. The plurality of layers of each strip means includes aligned folds and substantially aligned longitudinal portions respectively at each side of the aligned folds. The means for sequentially folding of each strip means causes initial folding in an area adjacent each cutting disc. The means for sequentially folding of the plurality of strip means causes initial folding adjacent a discharge of the two sets of cutting discs. The plurality of sheets includes the sheets having at least two different colors to cause the packing product to include the strip means with at least two different colors.

From the description provided, it should also be clear that the present invention includes a compacted material in a confined area, which compacted material for being used as a packing product when released from the confined area. The compacted material includes a plurality of elongated strips of material; each of the strips having a plurality of folds to be compacted against itself and against others of the plurality of strips; and the folds to the strips being relatively uniform to form a mass of strips having an accordion shape. The mass of strips is under pressure. The strips are intertwined and interlocking and the mass of strips is resilient. The material includes at least one of biodegradable material, pulp material, paper, cardboard, and mylar.

Further, each strip could include at least two layers of the material. The at least two layers of material could respectively include at least two colors to provide the two colors to the compacted material. Alternatively, each strip could include printing on at least one surface thereof.

The invention also includes a packing product including a plurality of narrow, elongated strip means of material; each of the strip means including a plurality of folds along a length thereof; and the plurality of strip means being interwined and interconnected to form a resilient mass of the packing product. The adjacent folds of each strip means are disposed in generally opposite directions. Each strip means includes portions between the adjacent folds which are substantially planar. The material includes a natural resilience and the natural resilience tends to oppose folding at the folds of each strip means. The material of each strip means at a majority of the folds forms a generally acute angle.

The invention further includes a packing product including a plurality of intertwined and interlocking strip means of material; each of the strip means including a plurality of folds with the material having been compressed at each of the folds; and the plurality of intertwined and interlocking strip means with the folds having been compressed therein combining to provide a resilient mass of the packing product. The folds have been compressed by compacting of each strip means at least against itself. The folds are relatively uniform to provide each strip means with a general accordion shape. Adjacent folds of each strip means are directed to generally opposite directions. Each strip means includes portions between the adjacent folds which are substantially planar.

Still further, the invention can include a packing product including a plurality of narrow, elongated strip means of material; each of the strip means having a small width dimension and a substantially longer length dimension; each strip means having a plurality of substantially transverse folds; each strip means including adjacent longitudinal portions at respective opposite sides of each of adjoining folds; and a majority of the adjacent longitudinal portions extending from the adjoining fold generally with an acute angle therebetween. Each of the adjacent longitudinal portions is substantially planar.

Additionally, the invention includes a packing product including a plurality of narrow, elongated strip means of material; the material having a natural resilience tending to oppose folding thereof; each of the strip means including relatively uniform folds to be generally accordion shaped; and the plurality of strip means being generally compacted against each other at the folds in opposition to the resilience. The natural resilience of the plurality of strip means is for tending to longitudinally expand each of the strip means with time. The plurality of strip means of material having the folds therein are capable of generally expanding under the natural resilience by generally unfolding the folds.

In all the embodiments described, the packing product can include material which includes at least one of biodegradable material, pulp material, paper, cardboard, and mylar. Each strip means can include at least two layers of the material. The at least two layers of the material can respectively include at least two colors to provide the two colors to the packing product. Further, each strip means could include printing on at least one surface thereof.

The means and construction disclosed herein are by way of example and comprise primarily the preferred form of putting the invention into effect. Although the drawings depict a preferred and alternative embodiment of the invention, other embodiments have been described within the preceding text. One skilled in the art will appreciate that the disclosed device may have a wide variety of shapes and configurations. Additionally, persons skilled in the art which the invention pertains might consider the foregoing teachings in making various modifications, other embodiments, and alternative forms of the invention.

It is, therefore, to be understood that the invention is not limited to the particular embodiments or specific features shown herein. To the contrary, the inventor claims the invention in all of its forms, including all alternatives, modifications, equivalents, and alternative embodiments which fall within the legitimate and valid scope of the appended claims, appropriately interpreted under the Doctrine of Equivalents.

For example, other cutting discs and comber configurations may be employed to produce wider strip means and/or for cutting even wider sheets of material to simultaneously produce more of the packing product. Similarly, other means could be employed to feed and/or create different lengths of sheets for cutting to produce longer strip means for the packing product. Clearly, the discharge chute could be altered to provide different means for collecting compressed strip means therein to vary the resistance on the cutting section without departing from the invention as claimed.

INDUSTRIAL APPLICABILITY

The folding and crimping apparatus, and method for use thereof, as described herein may be used to fold and crimp shredded strips of sheet material into selected lengths of interlocking, bulk packaging and/or decorative material. The shredded, folded, crimped, interlocking strips may serve as a resilient padding and/or wrapping material having various desired lengths. The crimped strips may be produced in a variety of colors or combination of colors an may have printing appearing thereon. The crimped strips are preferably made of recyclable, biodegradable material, and may also be made of an edible material or of a material which is approved by the U.S. Federal Food and Drug Administration for use with edible products. The apparatus is very durable in design, is easily constructed, is inexpensive and economical to manufacture, and is extremely simple to use.

It should be noted that two paper products of the invention were tested to determine the overall quality of the packing product to compare the characteristics to that of styrofoam peanuts. One of the paper products included ⅛ inch wide strips of 22 pound, Kraft paper and another ⅛ inch wide product was formed of one-sided corrugated cardboard paper of the type described hereinabove. In standard drop tests, the packing product formed of the one-sided corrugated material was equal to the styrofoam peanuts. However, since only one layer of the Kraft paper was used in the formation of the lighter packing product, the drop tests were not as successful for this product as the styrofoam peanuts. This thin, light paper would not normally be expected to have sufficient rigidity for a drop test when compared to the styrofoam peanuts.

Nevertheless, based on the results of the tests, the packing material sample displayed some very desirable qualities for its intended use. In a comparison with the standard styrofoam packing material, the paper-derived samples showed considerable comparable performance in the drop tests, and superior qualities in expansion, settling and moisture resistance. From the tests, it should be clear that with a proper selection of material, the preferred packing product could clearly perform as well as the standard styrofoam packing material, in most cases, and considerably better, in other cases, without having the attendant disadvantages of the styrofoam packing material.

What is claimed is:

1. A packing product comprising:

a plurality of narrow, elongated strip means of flat, substantially planar material;

said material having a natural resilience; and each of said strip means including a plurality of transverse folds against said natural resilience to form a longitudinally compressed said strip means.

2. The packing product according to claim 1, wherein a majority of said folds includes an acute angle.

3. The packing product according to claim 1, wherein said material of said longitudinally compressed strip means includes a plurality of layers.

4. The packing product according to claim 3, wherein plurality of said layers are respectively of different colors to provide said different colors to said packing product.

5. The packing product according to claim 1, wherein said longitudinally compressed strip means are biased to longitudinally expand.

6. The packing product according to claim 1, wherein said longitudinally compressed strip means are intertwined and interlocked to combine and form a resilient mass of said packing product.

7. The packing product according to claim 1, wherein each of said longitudinally compressed strip means includes substantially planar portions adjacent to each of said folds of said plurality of said folds.

8. The packing product according to claim 7, wherein said each longitudinally compressed strip means includes a predetermined width dimension and a majority of said planar portions includes a length dimension which is between said predetermined width dimension and twice said predetermined width dimension.

9. The packing product according to claim 1, wherein said each of said longitudinally compressed strip means includes printing on at least one surface thereof.

10. The packing product according to claim 1, wherein said material is selected from the group consisting of biodegradable material, pulp material, paper, cardboard, and mylar.

11. the packing product according to claim 1, wherein said folds are relatively uniform to provide each of said longitudinally compressed strip means with a general accordion shape.

12. The packing product according to claim 1, wherein said each longitudinally compressed strip means having said plurality of said folds includes side, lateral strength and resistance to collapsing.

13. A packing product comprising:

a plurality of narrow, elongated strip means of flat, substantially planar material;

said material having a natural resilience tending to oppose folding thereof;

each of said strip means including a plurality of relatively uniform folds to be generally accordion shaped; and said plurality of said strip means being generally compacted against each other at said folds in opposition to said resilience.

14. The packing product according to claim 13, wherein said natural resilience of said plurality of strip means is for tending to longitudinally expand said each strip means with time.

15. The packing product according to claim 13, wherein said plurality of said strip means of said material having said folds therein are capable of generally expanding under said natural resilience by generally unfolding said folds.

16. The packing according to claim 13, wherein said each strip means includes at least two layers of said material.

17. The packing product according to claim 16, wherein said at least two layers of said material respectively include at least two colors to provide said at least two colors to said packing product.

18. The packing product according to claim 13, wherein said each strip means includes printing on at least one surface thereof.

19. The packing product according to claim 13, wherein said each strip means has a small width dimension and a substantially longer length dimension;

each of said folds of said plurality extends across said width dimension to be substantially transverse of said length dimension;

said each strip means includes adjacent longitudinal portions at respective opposite sides of said each fold; and a majority of said adjacent longitudinal portions extents from said each fold generally with an acute angle therebetween.

20. The packing product according to claim 19, wherein each of said adjacent longitudinal portions is substantially planar.

21. The packing product according to claim 20, wherein said each strip means includes at least two layers of said material and said at least two layers within said each adjacent longitudinal portion are substantially parallel.

22. The packing product according to claim 13, wherein said plurality of said strip means are intertwined and interlocked;

said plurality of said folds includes said meterial having been compressed at each of said folds; and said plurality of said strip means with said folds having been compressed therein are combined to provide a resilient mass of said packing product.

23. The packing product according to claim 22, wherein said folds have been compressed by compacting of said each strip means at least against itself.

24. The packing product according to claim 13, wherein said material is selected from the group consisting of biodegradable material, pulp material, paper, cardboard, and mylar.

25. The packing product according to claim 13, said each strip means including said folds includes side, lateral strength and resistance to collapsing.

26. A compacted material in a confined area, said compacted material for being used as a packing product when released from said confined area, said compacted material comprising:

a plurality of elongated strip means being formed from a flat, substantially planar material;

each of said strip means having a plurality of folds to be compacted against itself and against other said strip means of said plurality of said strip means; and said folds of said strip means being relatively uniform to form a mass of said strip means which has an accordion shape.

27. The compacted material according to claim 26, wherein said mass of said strip means is under pressure.

28. The compact material according to claim 26, wherein said plurality of said strip means are intertwined and interlocking and said mass of said strip means is resilient.

29. The compacted material according to claim 26, wherein said each strip means including at least two layers of said flat, substantially planar material.

30. The compacted material according to claim 29, wherein said at least two layers of said flat, substantially planar material respectively include at least two colors to provide said two colors to said compacted material.

31. The compacted material according to claim 26, wherein said each strip means includes adjacent longitudinal portions at respective opposite sides of each of said folds of said plurality and said adjacent portions extend generally parallel from said each fold therebetween.

32. The compacted material according to claim 31, wherein each of said adjacent longitudinal portions is substantially planar.

33. The compact material according to claim 32, wherein in said each strip means includes at least two layers of said flat, substantially planar material and said at least two layers within said each adjacent longitudinal portion are generally parallel.

34. The compacted material according to claim 26, wherein said flat, substantially planar material is selected from the group consisting of biodegradable material, pulp material, paper, cardboard, and mylar.

35. The compacted material according to claim 26, wherein said each strip means includes printing on at least one surface thereof.

* * * * *

US005173352B1

REEXAMINATION CERTIFICATE (3441st)

United States Patent [19]

[11] B1 5,173,352

Parker

[45] Certificate Issued *Feb. 17, 1998

[54] RESILIENT PACKING PRODUCT AND METHOD AND APPARATUS FOR MAKING THE SAME

[75] Inventor: Johnny M. Parker, Vashon, Wash.

[73] Assignee: Ranpak Corp., Concord Township, Ohio

Reexamination Request:

No. 90/004,288, Jun. 26, 1996

Reexamination Certificate for:

| | |
|---|---|
| Patent No.: | **5,173,352** |
| Issued: | **Dec. 22, 1992** |
| Appl. No.: | **538,181** |
| Filed: | **Jun. 14, 1990** |

[ * ] Notice: The portion of the term of this patent subsequent to Jul. 28, 2009, has been disclaimed.

Related U.S. Application Data

[63] Continuation-in-part of Ser. No. 430,861, Nov. 2, 1989, Pat. No. 5,088,972.

[51] Int. Cl.$^6$ .................................. B32B 3/28; D04H 1/04

[52] U.S. Cl. .......................... 428/174; 428/152; 428/153; 428/154; 428/175; 428/182; 428/184; 428/195; 428/196; 428/211; 428/222; 428/362; 428/369; 493/967

[58] Field of Search .................................... 428/182, 184, 428/192, 222, 174, 152, 153, 226, 227, 229, 230, 292, 369, 2, 154, 352, 175, 195, 196, 207, 211; 493/967, 968; 220/429; 267/141

[56] References Cited

U.S. PATENT DOCUMENTS

| | | | |
|---|---|---|---|
| 1,680,203 | 8/1928 | Cannard | 493/967 |
| 1,985,676 | 12/1934 | Hand | 270/73 |
| 2,045,498 | 6/1936 | Stevenson | 28/1 |
| 2,271,180 | 1/1942 | Brugger | 428/119 |
| 2,537,026 | 1/1951 | Brugger | 156/470 |
| 2,621,567 | 12/1952 | Lee | 93/1 |
| 2,668,573 | 2/1954 | Larsson | 154/30 |
| 2,679,887 | 6/1954 | Doyle et al. | 154/30.05 |
| 2,686,466 | 8/1954 | Lee | 106/97 |
| 2,770,302 | 11/1956 | Lee | 104/97 |
| 2,786,399 | 3/1957 | Mason et al. | 93/1 |
| 2,865,080 | 12/1958 | Hentschel | 28/1 |
| 2,924,154 | 2/1960 | Russell et al. | 93/1 |
| 2,968,857 | 1/1961 | Swerdloff et al. | 28/72 |
| 3,126,095 | 3/1964 | Caines et al. | 478/369 |
| 3,150,576 | 9/1964 | Gewiss | 93/84 |
| 3,217,988 | 11/1965 | Lightfoot et al. | 241/101 |
| 3,235,442 | 2/1966 | Stump | 428/369 |
| 3,398,223 | 8/1968 | Schatz et al. | 264/282 |
| 3,501,565 | 3/1970 | Kalwaites et al. | 264/287 |

(List continued on next page.)

FOREIGN PATENT DOCUMENTS 771877 3/1957 United Kingdom .

OTHER PUBLICATIONS

Websters II New Riverside University Dictionary, 1984, pp. 639 and 1247.

*Primary Examiner*—Donald J. Loney

[57] ABSTRACT

A method of producing a packing product includes the steps of feeding at least one sheet of material in a first direction; cutting the at least one sheet of material into a plurality of strips; the cutting being performed by rotating two sets of alternating, overlapping cutting discs; the feeding of the at least one sheet of material being between the two sets of cutting discs; advancing each of the strips by the rotating of at least an outer surface of a corresponding one of the cutting discs as the outer surface moves in the first direction; restricting each strip from continued advancing in the first direction; and sequentially folding each of the strip means by the restricting in opposition to the advancing. There is included apparatus and means for producing the packing product. Additionally, the resulting packing product includes a plurality of narrow, elongated strips of material; the material having a natural resilience; and each of the strips including a plurality of transverse folds against the natural resilience to form a longitudinally compressed strip element.

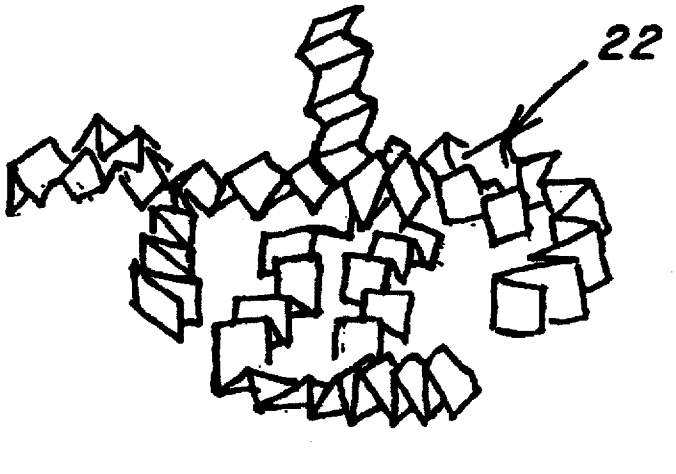

U.S. PATENT DOCUMENTS

| | | | |
|---|---|---|---|
| 3,509,797 | 5/1970 | Johnson | 493/407 |
| 3,613,522 | 10/1971 | Johnson | 156/183 |
| 3,650,877 | 3/1972 | Johnson | 493/407 |
| 3,754,498 | 8/1973 | Gil | 100/97 |
| 3,859,695 | 1/1975 | Erickson | 28/1 |
| 3,905,057 | 9/1975 | Willis et al. | 5/337 |
| 4,012,932 | 3/1977 | Gewiss | 72/187 |
| 4,075,746 | 2/1978 | Roberts | 28/264 |
| 4,085,662 | 4/1978 | Ottaviano | 493/354 |
| 4,132,155 | 1/1979 | Hicks et al. | 493/354 |
| 4,201,128 | 5/1980 | Whitehead et al. | 100/97 |
| 4,247,289 | 1/1981 | McCade | 493/386 |
| 4,410,315 | 10/1983 | Frye | 493/342 |
| 4,597,748 | 7/1986 | Wolf | 493/29 |
| 4,622,028 | 11/1986 | Bunch | 493/413 |
| 4,650,456 | 3/1987 | Armington | 493/464 |
| 4,699,609 | 10/1987 | Komaransky et al. | 493/357 |
| 4,700,939 | 10/1987 | Hathaway | 270/39 |
| 4,717,135 | 1/1988 | Hathaway | 270/52.3 |
| 4,718,654 | 1/1988 | Ehlers | 220/52.3 |
| 4,868,037 | 9/1989 | McCullough et al. | 428/222 |

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 3, 4, 6, 16, 17, 21–23, 28–30 and 33 is confirmed.

Claims 1, 2, 5, 7–15, 18–20, 24–27, 31, 32, 34 and 35 are cancelled.

New claims 36–72 are added and determined to be patentable.

*36. A packing product comprising:*

*a plurality of narrow, elongated strip means of flat, substantially planar material;*

*said material having a natural resilience; and*

*each of said strip means including a plurality of transverse folds against said natural resilience to form a longitudinally compressed said strip means;*

*wherein said longitudinally compressed strip means are intertwined and interconnected.*

*37. The packing product according to claim 36, wherein a majority of said folds includes an acute angle.*

*38. The packing product according to claim 36, wherein said material of said longitudinally compressed strip means includes a plurality of layers.*

*39. The packing product according to claim 38, wherein plurality of said layers are respectively of different colors to provide said different colors to said packing product.*

*40. The packing product according to claim 36, wherein said longitudinally compressed strip means are biased to longitudinally expand.*

*41. The packing product according to claim 36, wherein said longitudinally compressed strip means combine and form a resilient mass of said packing product.*

*42. The packing product according to claim 36, wherein each of said longitudinally compressed strip means includes substantially planar portions adjacent to each of said folds of said plurality of said folds.*

*43. The packing product according to claim 42, wherein said each longitudinally compressed strip means includes a predetermined width dimension and a majority of said planar portions includes a length dimension which is between said predetermined width dimension and twice said predetermined width dimension.*

*44. The packing product according to claim 36, wherein said each of said longitudinally compressed strip means includes printing on at least one surface thereof.*

*45. The packing product according to claim 44 wherein said printing is located longitudinally along the length of the strip means.*

*46. The packing product according to claim 36, wherein said material is selected from the group consisting of biodegradable material, pulp material, paper, cardboard, and mylar.*

*47. The packing product according to claim 36, wherein said folds are relatively uniform to provide each of said longitudinally compressed strip means with a general accordion shape.*

*48 The packing product according to claim 36, wherein said each longitudinally compressed strip means having said plurality of said folds includes side, lateral strength and resistance to collapsing.*

*49. A packaging product comprising:*

*a plurality of narrow, elongated strip means of flat, substantially planar material;*

*said material having a natural resilience tending to oppose folding thereof;*

*each of said strip means including a plurality of relatively uniform folds to be generally accordion shaped; and*

*said plurality of said strip means being generally compacted against each other at said folds in opposition to said resilience;*

*wherein said longitudinally compressed strip means are intertwined and interconnected.*

*50. The packing product according to claim 49, wherein said natural resilience of said plurality of strip means is for tending to longitudinally expand said each strip means with time.*

*51. The packing product according to claim 49, wherein said plurality of said strip means of said material having said folds therein are capable of generally expanding under said natural resilience by generally unfolding said folds.*

*52. The packing according to claim 49, wherein said each strip means includes at least two layers of said material.*

*53. The packing product according to claim 52, wherein said at least two layers of said material respectively include at least two colors to provide said at least two colors to said packing product.*

*54. The packing product according to claim 49, wherein said each strip means includes printing on at least one surface thereof.*

*55. The packing product according to claim 54 wherein said printing is located longitudinally along the length of the strip means.*

*56. The packing product according to claim 49, wherein*

*said each strip meas has a small width dimension and a substantially longer length dimension;*

*each of said folds of said plurality extends across said width dimension to be substantially transverse of said length dimension;*

*said each strip means includes adjacent longitudinal portions at respective opposite sides of said each fold; and*

*a majority of said adjacent longitudinally portions extends from said each fold generally with an acute angle therebetween.*

*57. The packing product according to claim 56, wherein each of said adjacent longitudinal portions is substantially planar.*

*58. The packing product according to claim 57, wherein said each strip means includes at least two layers of said material and said at least two layers within said each adjacent longitudinal portion are substantially parallel.*

*59. The packing product according to claim 49, wherein*

*said plurality of said folds includes said material having been compressed at each of said folds; and*

*said plurality of said strip means with said folds having been compressed therein are combined to provide a resilient mass of said packing product.*

*60. The packing product according to claim 59, wherein said folds have been compressed by compacting of said each strip means at least against itself.*

*61. The packing product according to claim 49, wherein said material is selected from the group consisting of biodegradable material, pulp material, paper, cardboard, and mylar.*

*62. The packing product according to claim 49, said each strip means including said folds includes side, lateral strength and resistance to collapsing.*

*63. A compacted material in a confined area, said compacted material for being used as a packing product when released from said confined area, said compacted material comprising:*

- *a plurality of elongated strip means being formed from a flat, substantially planar material;*
- *each of said strip means having a plurality of folds to be compacted against itself and against other said strip means of said plurality of said strip means; and*
- *said folds of said strip means being relatively uniform to form a mass of said strip means which has an accordion shape;*
- *wherein said plurality of said strip means are intertwined and interlocking and said mass of said strip means is resilient.*

*64. The compacted material accordion to claim 63, wherein said mass of said strip means in under pressure.*

*65. A compacted material in a confined area, said compacted material for being used as a packing product when released from said confined area, said compacted material comprising:*

- *a plurality of elongated strip means being formed from a flat, substantially planar material;*
- *each of said strip means having a plurality of folds to be compacted against itself and against other said strip means of said plurality of said strip means;*
- *said folds of said strip means being relatively uniform to form a mass of said strip means which has an accordion shape; and*
- *said each strip means including at least two layers of said flat, substantially planar material.*

*66. The compacted material according to claim 29, wherein said at least two layers of said flat, substantially planar material respectively include at least two colors to provide said two colors to said compacted material.*

*67. The compacted material according to claim 63, wherein said each strip means includes adjacent longitudinal portions at respective opposite sides of each of said folds of said plurality and said adjacent portions extend generally parallel from said each fold therebetween.*

*68. The compacted material according to claim 67, wherein each of said adjacent longitudinal portions is substantially planar.*

*69. A compacted material in a confined area, said compacted material for being used as a packing product when released from said confined area, said compacted material comprising:*

- *a plurality of elongated strip means being formed from a flat, substantially planar material;*
- *each of said strip means having a plurality of folds to be compacted against itself and against other said strips means of said plurality of said strip means; and*
- *said folds of said strip means being relatively uniform to form a mass of said strip means which has an accordion shape;*

*wherein:*

- *said each strip means include adjacent longitudinal portions at respective opposite sides of each of said folds of said plurality and said adjacent portions extend generally parallel from said each fold therebetween;*
- *each of said adjacent longitudinal portions is substantially planar;*
- *said each strip means includes at least two layers of said flat, substantially planar material and said at least two layers within said each adjacent longitudinal portion are generally parallel.*

*70. The compacted material according to claim 63, wherein said flat, substantially planar material is selected from the group consisting of biodegradable material, pulp material, paper, cardboard, and mylar.*

*71. The compacted material according to claim 63, wherein said each strip means includes printing on at least one surface thereof.*

*72. The compacted material according to claim 71 wherein said printing is located longitudinally along the length of the strip means.*

* * * * *